United States Patent
Albertine et al.

(10) Patent No.: US 10,467,710 B2
(45) Date of Patent: Nov. 5, 2019

(54) SOCIAL MEDIA PLATFORM ENABLING MULTIPLE SOCIAL MEDIA ALIASES

(71) Applicant: BlackBook Media Inc., Quincy, MA (US)

(72) Inventors: Scott Herman Albertine, Cambridge, MA (US); K. Viktor Golubic, Quincy, MA (US); Thomas Joseph Huber, II, Medford, MA (US)

(73) Assignee: BlackBook Media Inc., Quincy, MA (US)

( * ) Notice: Subject to any disclaimer, the term of this patent is extended or adjusted under 35 U.S.C. 154(b) by 231 days.

(21) Appl. No.: 15/600,000

(22) Filed: May 19, 2017

(65) Prior Publication Data

US 2018/0336644 A1    Nov. 22, 2018

(51) Int. Cl.
| | |
|---|---|
| *G06Q 50/00* | (2012.01) |
| *H04L 29/08* | (2006.01) |
| *G06F 16/435* | (2019.01) |
| *G06F 21/45* | (2013.01) |
| *H04L 29/06* | (2006.01) |

(52) U.S. Cl.
CPC ............ *G06Q 50/01* (2013.01); *G06F 16/437* (2019.01); *G06F 21/45* (2013.01); *H04L 67/18* (2013.01); *H04L 67/20* (2013.01); *H04L 67/306* (2013.01); *H04L 67/42* (2013.01)

(58) Field of Classification Search
CPC ........ G06F 16/437; G06F 21/31; G06F 21/45; G06Q 50/01; H04L 67/306; H04L 67/18; H04L 67/20; H04L 67/42
See application file for complete search history.

(56) References Cited

U.S. PATENT DOCUMENTS

| | | | | |
|---|---|---|---|---|
| 8,271,894 | B1 * | 9/2012 | Mayers | G06Q 50/01 705/319 |
| 9,871,757 | B1 * | 1/2018 | Reardon | H04L 51/32 |
| 2010/0088753 | A1 * | 4/2010 | Ayres | G06F 21/41 726/9 |
| 2011/0047245 | A1 * | 2/2011 | Abramson | H04M 1/2535 709/219 |
| 2011/0289574 | A1 | 11/2011 | Hull et al. | |
| 2012/0233265 | A1 * | 9/2012 | Joy | G06Q 50/01 709/206 |
| 2012/0246230 | A1 * | 9/2012 | Ferbar | G06Q 50/01 709/204 |

(Continued)

OTHER PUBLICATIONS

"Syncing Facebook, Twitter and LinkedIn: pros, cons and how to do it", Nov. 26, 2015, Ecommerce Guide, pp. 9 (Year: 2015).*

(Continued)

*Primary Examiner* — Chau T Nguyen
(74) *Attorney, Agent, or Firm* — Fish & Richardson P.C.

(57) ABSTRACT

An example social media platform enables a user to establish multiple user aliases. By using multiple user aliases, the user can selectively control the dissemination of information to other users. For instance, a user can establish two different user aliases on the social media platform, and use each of the user aliases to perform different social media actions. The user can use the user aliases to present different information regarding himself, publish different content, and/or interact with different groups of users.

48 Claims, 24 Drawing Sheets

(56) References Cited

U.S. PATENT DOCUMENTS

| | | | |
|---|---|---|---|
| 2013/0144951 A1* | 6/2013 | Viswanath | H04L 29/08 709/204 |
| 2013/0176895 A1 | 7/2013 | McEachern et al. | |
| 2014/0081909 A1* | 3/2014 | Price | G06F 16/215 707/609 |
| 2015/0121373 A1* | 4/2015 | Black | G06F 9/45533 718/1 |

OTHER PUBLICATIONS

International Search Report and Written Opinion for corresponding PCT Appl No. PCT/US18/33475, dated Jul. 30, 2018.

* cited by examiner

SOCIAL MEDIA PLATFORM ENABLING MULTIPLE SOCIAL MEDIA ALIASES

TECHNICAL FIELD

This disclosure relates to social media platforms, and more specifically to social media platforms enabling users to establish multiple different user aliases.

BACKGROUND

A social media platform is an online platform that enables users to build social networks and/or social relationships with other users. For instance, a user can establish an online persona or identity on the social media platform, and use the persona or identity to interact with other users. As an example, a user can create a user alias by inputting personal information, biographical information, and/or other information regarding himself (e.g., name, contact information, personal interests, job information, photographs, videos, audio, etc.). Further, a user can associate himself with other users of the social media platform (e.g., by specifying one or more users that are acquaintances, business connections, and/or friends).

In some cases, a social media platform also enables users to share information with one another. For example, in some social media platforms, users can transmit messages, photographs, videos, audio, documents, and/or other content to one another via the social media platform.

In some cases, a social media platform also enables users to promote and organize events. For example, in some social media platforms, a user can input information regarding an upcoming event, and share the information with other users. Recipients can review information regarding the event, discuss the event, and/or RSVP to the event.

SUMMARY

A social media platform can enable a user to establish multiple user aliases. By using multiple user aliases, the user can selectively control the dissemination of information to other users. For instance, a user can establish two different user aliases on the social media platform, and use each of the user aliases to perform different social media actions. The user can use the user aliases to present different information regarding himself, publish different content, and/or interact with different groups of users.

One or more of the implementations described herein can provide various technical benefits. For example, implementations of a social media platform can enable users to quickly and efficiently communicate over a computerized communications network. For instance, a user can interact with one social media platform to efficiently share information across multiple different social media platforms, without requiring that the manually and separately compose the information for each individual social media platform. Thus, the computational and network resources utilized by the user's device are reduced. Further, a user can closely control the distribution of information, such that potentially sensitive information is not revealed without the user's consent. As such, implementations of the social media platform provide a more secure form of computerized communication. Further still, implementations of the social media platform receive, process, store, and/or transmit data according to specific data structures and rules, thereby enabling the social media platform to operate consistently, reliably, and efficiently, either alone, or in conjunction with other computerized systems.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

A social media platform can enable a user to establish multiple user aliases. By using multiple user aliases, the user can selectively control the dissemination of information to other users. For instance, a user can establish two different user aliases on the social media platform, and use each of the user aliases to perform different social media actions. The user can use the user aliases to present different information regarding himself, publish different content, and/or interact with different groups of users.

As an example, a first user alias can correspond to a user's "personal" identity, and can contain information that the user wishes to share with close acquaintances (e.g., potentially sensitive information that the user may not want to share to a broad audience). Further, the user can associate himself with and communicate with his close acquaintances using the first user alias.

In contrast, a second user alias can correspond to a user's "work" identity, and can contain information that the user wishes to share with his work-based acquaintances (e.g., information that can be shared with co-workers, business contacts, etc.). Further, the user can associate himself with his work-based acquaintances using the second user alias.

The user can link the first and second user aliases together on the social media platform, and can switch between the two user aliases to selectively interact with other users and/or publish information according to each user alias. However, to the other users of the social media platform, the two aliases appear to be segregated, and do not appear to be linked. Thus, the user can maintain multiple aliases on the social media platform, and can compartmentalize his activities and communications with respect to different audiences.

Although a "personal" identity" and a "work" identity are described herein, these are merely illustrative examples. In practice, a user can establish any number of different social media aliases, and compartmentalize his activities and communications in any way. As an example, a user can establish different social media aliases to reflect different personal interests, different social groups, different geographical regions, different organizations that he is a part of, and/or any other factors or criteria.

Figure 1:
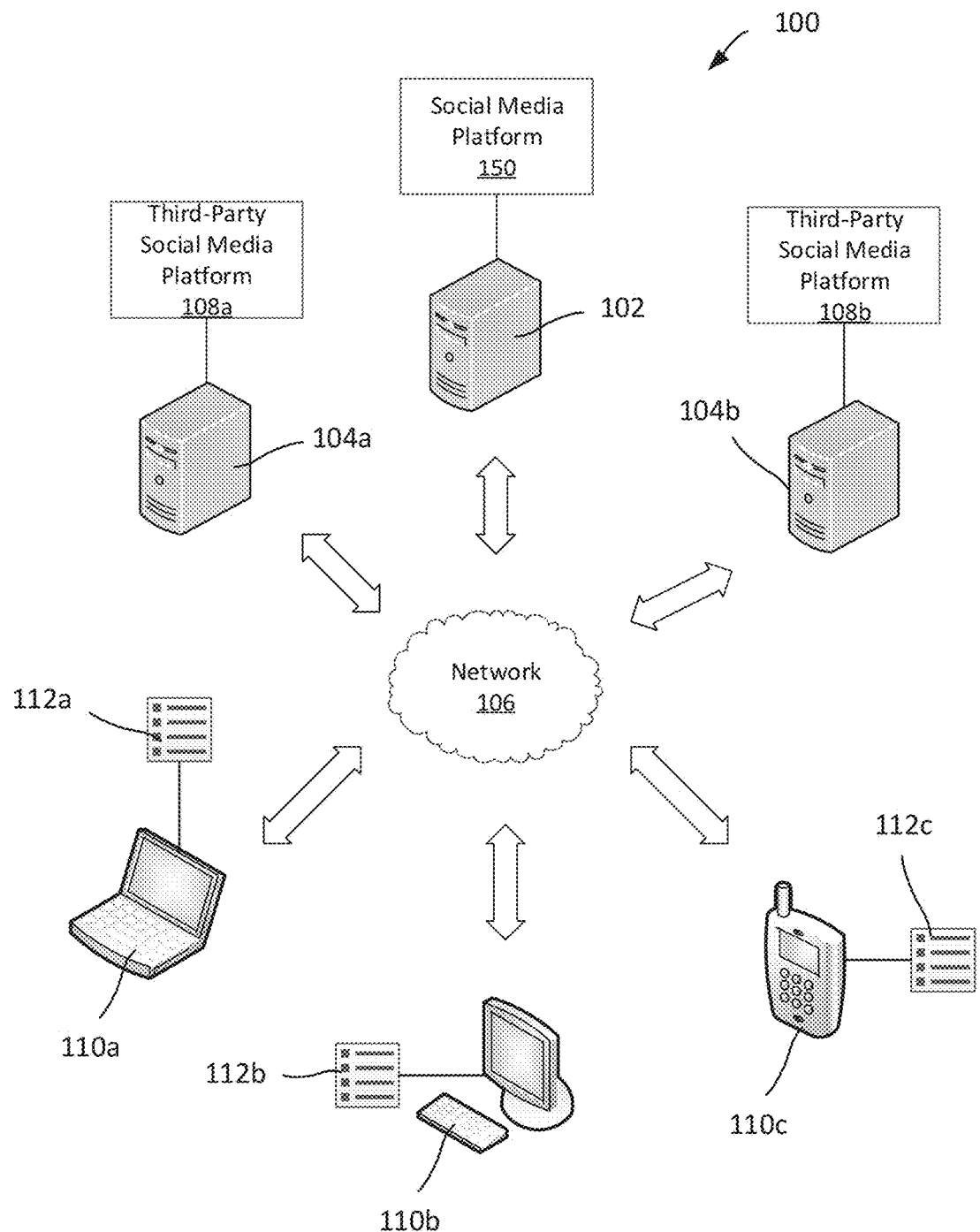
FIG. 1 is a diagram of an example system for implementing social media platform.

An example system 100 for implementing a social media platform is shown in FIG. 1. The system 100 includes a social media platform 150 maintained on a server system 102 that includes one or more server computers.

The server system 102 is communicatively connected to third-party server systems 104a, 104b through a network 106. The third-party server system 104a, 104b each include one or more server computers. The third-party social media platforms 108a, 108b are maintained on the third-party server systems 104a, 104b, respectively. In some cases, the third-party social media platforms are social media platforms that are owned, operated, and/or maintained by parties different than those that own, operate, and/or maintain the social media platform 150. In some cases, third-party social media platforms can include social media platforms such as Facebook, Twitter, LinkedIn, Instagram, or other social media platforms.

The server system 102 is also communicatively connected to client devices 110a-c through the network 106. Each client device 110a-c includes a respective user interface 112a-c. Users can interact with the user interfaces 112a-c to view data (e.g., data on the server systems 102 and the platform 150, data on the server systems 104a, 104b and the platforms 108a, 108b, and/or data on other the client devices 110a-c). Users can also interact with the user interfaces 112a-c to transmit data to other devices (e.g., to the server systems 102 and the platform 150, to the server systems 104, 104b and the platforms 108a, 108b, and/or to the other client devices 110a-c). Users can interact with the user interfaces 112a-c to issue commands (e.g., to the server systems 102 and the platform 150, to the server systems 104a, 104b and the platforms 108a, 108b, and/or to the other client devices 110a-c). In some implementations, a user can install a software application onto a client device 110a-c in order to facilitate performance of these tasks.

A client device 110a-c can be any electronic device that is used by a user to view, process, transmit and receive data. Examples of the client devices 110a-c include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 106. The client devices 110a-c can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, one or more of the client devices 110a-c need not be located locally with respect to the rest of the system 100, and one or more of the client devices 110a-c can be located in one or more remote physical locations. In some implementations, the client devices 110a-c can communicate with a geo-positioning system (e.g., a global positioning system [GPS], Wi-Fi triangular system, and so forth) in order to determine its geographical location.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

The server systems 102, 104a, and 104b are each illustrated as a respective single component. However, in practice, each can be implemented on one or more computing devices. A server system 102, 104a, or 104b can be, for instance, a single computing device that is connected to the network 106, and a social media platform 108a, 108b, or 150 can be maintained and operated on the single computing device. In some implementations, a server system 102, 104a, or 104b include multiple computing devices that are connected to the network 106, and a social media platform 108a, 108b, or 150 can be maintained and operated on some or all of the computing devices. For instance, the server system 102 can include several computing devices, and the platform 150 can be distributive on one or more of these computing devices. In some implementations, a server system 102, 104a, or 104b need not be located locally to the rest of the system 100, and portions of a server system 102, 104a, or 104b can be located in one or more remote physical locations.

Figure 2:
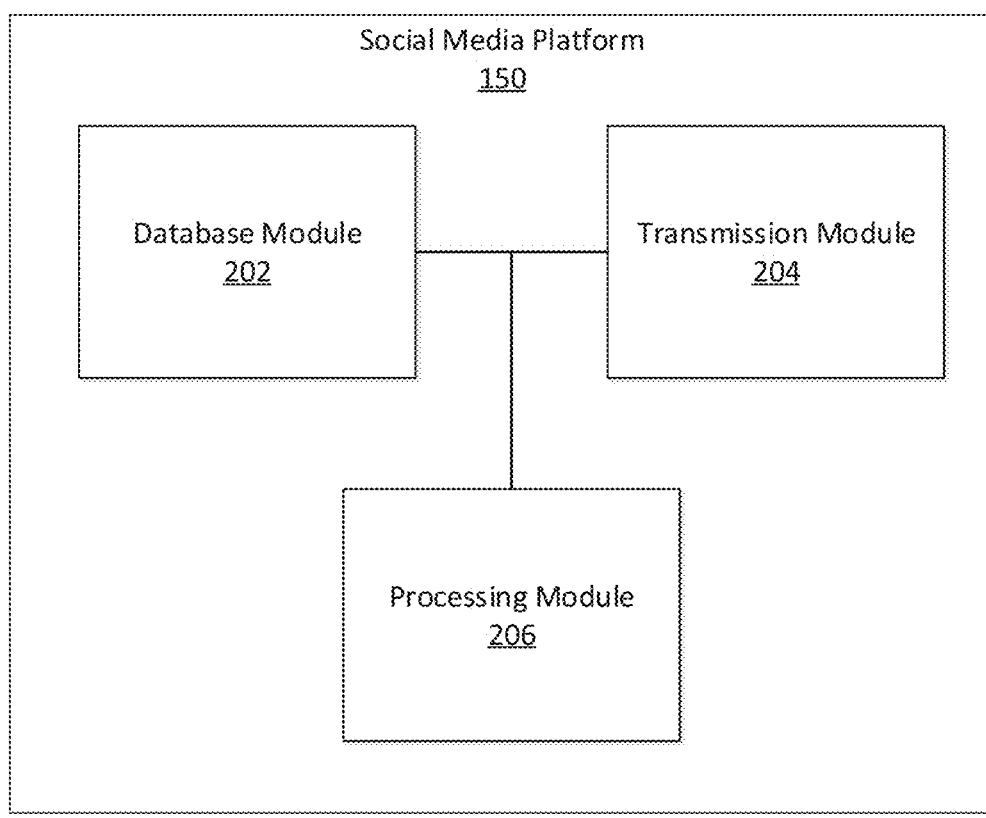
FIG. 2 is a diagram of an example social media platform.

FIG. 2 shows various aspects of the platform 150. The platform 150 includes several modules that perform particular functions related to the operation of the system 100. For example, the platform 150 can include a database module 202, a transmission module 204, and a processing module 206.

The database module 202 maintains information related to one or more users of the system 100. As example, the database module 202 can store information regarding a user's identity credentials (e.g., user name and password), contact information (e.g., e-mail address, physical address, phone number, and so forth), demographic information (e.g., age, gender, geographical region, and so forth), preferences (e.g., system preferences), location (e.g., geographical coordinates, such as those determined using a global positioning system (GPS), Wi-Fi triangulation system, or other geo-positioning system), relationship information (e.g., indications of a user's association with other users, an indication of links between social media aliases, etc.), and other user information (e.g., collections of the user's written content, photographs, videos, audio content, and so forth). Although different examples of information are described above, these are merely illustrative. In practice, the database module 202 can store any information related to the users of the platform 150, or any other information pertaining to the platform 150.

The transmission module 204 allows for the transmission of data to and from the platform 150. For example, the transmission module 204 can be communicatively connected to the network 106, such that it can transmit data to the server systems 104a, 104b and/or the client devices 110a-c, and receive data from the server systems 104a, 104b and/or the client devices 110a-c via the network 106. As an example, information inputted by users on the client devices 110a-c can be transmitted to the platform 150 through the transmission module 204. This information can then be processed (e.g., using the processing module 206) and/or stored (e.g., using the database module 202). As another example, information from the platform 150 (e.g., information stored on the database module 202) can be transmitted to one or more of the server systems 104a, 104b and/or the client devices 110a-c through transmission module 204.

The processing module 206 processes data stored or otherwise accessible to the platform 150. For instance, the processing module 206 can execute automated or user-initiated processes that manipulate data pertaining to one or more users. As an example, the processing module 206 can manipulate data stored on the database module 202, or data that is received from the transmission module 204. Likewise, processed data from the processing module 206 can be stored on the database module 202 and/or sent to the transmission module 204 for transmission to other devices. Example processes that can be performed by the processing module 206 are described in greater detail below.

As described above, one or more implementations of the social media platform 150 enable a user to maintain multiple aliases on the social media platform 150, such that he can compartmentalize his activities and communications with respect to different audiences. An example of this functionality is illustrated in FIGS. 3A and 3B.

Figure 3A:
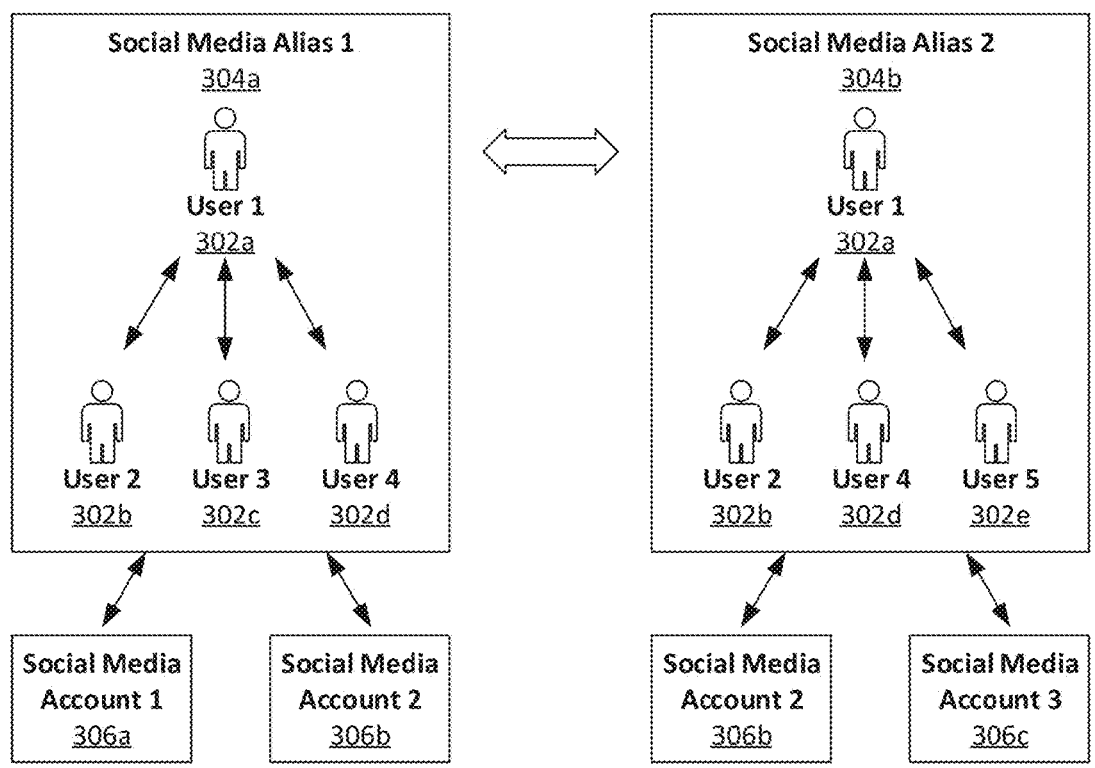
FIGS. 3A-3B are diagrams showing an example process of compartmentalizing user activities and communications using multiple social media aliases.
Figure 3B:
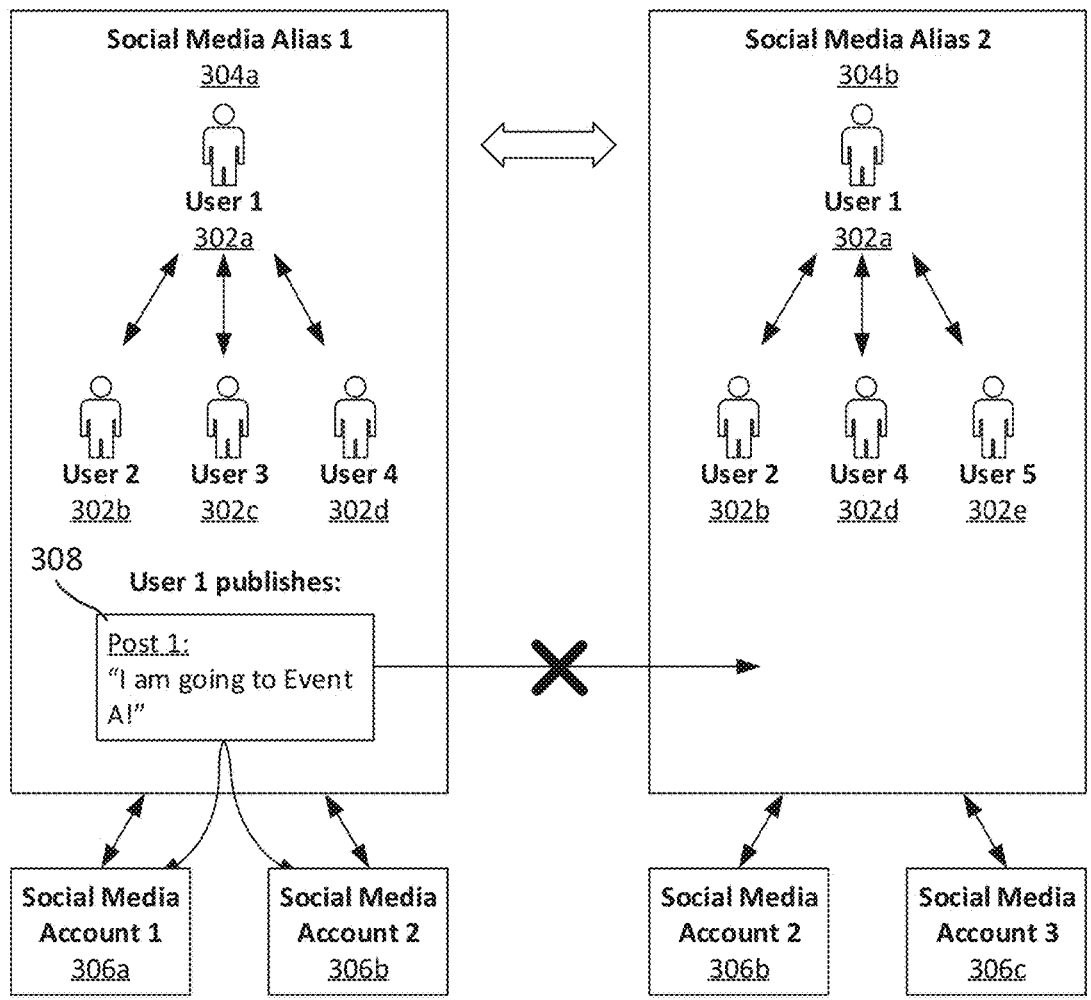

As shown in FIG. 3A, a first user 302a (i.e., "User 1") maintains two different social media aliases on the social media platform, a first social media alias 304a (i.e., "Social Media Alias 1") and a second social media alias 304b (i.e., "Social Media Alias 2"). The social media aliases 304a and 304b enable the first user 302a to compartmentalize his activities and communications with respect to different audiences. As an example, the first user 302a can use the first social media alias 304a to associate himself with and communicate with a particular set of users (e.g., a user 302b, a user 302c, and a user 302d). Further, the first user 302a can publish content (e.g., personal information, photographs, videos, audio, or other information) to the particular set of users. Similarly, the first user 302a can use the second social media alias 304b to associate himself with and communicate with a different set of users (e.g., the user 302b, the user 302d, and a user 302e). Further, the first user 302a can publish different content (e.g., personal information, photographs, videos, audio, or other information) to the different set of users. Information regarding the aliases 304a, 304b (e.g., records of user communications, personal information, photographs, videos, audio, indications of the associations between users with respect to the aliases 304a, 304b, etc.) can be stored, for example, by the database module 202.

The social media aliases 304a, 304b can correspond to different personas or identities of the first user 302a. For example, the first social media alias 304a can correspond to the first user's "personal" identity, and can be used by the first user 302a to conduct himself with his close acquaintances (e.g., the user 302b, the user 302c, and the user 302d). As another example, the second social media alias 304b can correspond to the first user's "work" identity, and can be used by the first user 302a to conduct himself with his work-based acquaintances (e.g., the user 302b, the user 302d, and the user 302e). Thus, the first user 302a can store content, publish content, communicate, and/or otherwise interact with the social media platform 150 differently with respect to each alias, such that he maintains separate personas or identities for each alias.

The first user's associates need not be mutually exclusive between the social media aliases 304a, 304b. In some cases, one or more users can be common between the first user's aliases 304a, 304b. For example, as shown in FIG. 3A, the first user 302a has associated himself with the users 302b, 302d using both of the aliases 304a, 304b. These common associations could reflect, for example, particular users who are familiar with the first user 302a in multiple different contexts (e.g., co-workers who are also close acquaintances).

As shown in FIG. 3A, the social media aliases 304a, 304b are linked together. This link enables the first user 302a to readily switch between the two social media aliases 304a, 304b to selectively interact with other users and/or publish information according to each user alias. However, to the other users of the social media platform, the two aliases 304a, 304b appear to be segregated, and do not appear to be linked. Thus, the first user 302a can maintain multiple aliases on the social media platform, and can compartmentalize his activities and communications with respect to different audiences. Information regarding this link can be stored, for example, by the database module 202. For instance, information regarding links can be stored as a data structure with one or more data fields containing indications of the links between social media aliases.

As an example, a data structure can include a table of pairs of identifiers, where each identifier refers to a particular social media alias (e.g., a user name, or some other identifier). Each pair in the table can represent a link between two social media aliases. When multiple users are aliased, the table can include all of the possible pairs among the group of aliases. For example, if a first alias (having an identifier of "1"), a second alias (having an identifier of "2"), and a third alias (having an identifier of "3") are linked, the table can include the following pairs:

1,2
2,1
1,3
3,1
2,3
3,2

The social media aliases 304a, 304b also can be linked to one or more of the first user's accounts on third-party social media platforms. Information can be selectively shared between the social media platform 150 and one or more third-party social media platforms (e.g., one or more of the third-party social media platforms 108a-c shown in FIG. 1) based on these links. The first user's accounts need not be mutually exclusive between the social media aliases 304a, 304b. In some cases, one or more user accounts can be common between the first user's aliases 304a, 304b. For example, as shown in FIG. 3A, the first social media alias 304a is linked to a first user account 306a (e.g., a user account held by the first user 302a on a particular third-party social media platform), and to a second user account 306b (e.g., another user account held by the first user 302a on another third-party social media platform). Further, the second social media alias 304b also is linked to the second user account 306b and to a third user account 306c.

Information regarding these links can be stored, for example, by the database module 202. In some cases, information regarding these links could include authentication credentials for accessing the accounts (e.g., user name, password, etc.). For instance, information regarding links can be stored as a data structure with one or more data fields containing indications of linked social third-party platforms, authentication credentials to access a particular user account on those platforms, etc.). As an example, a OAuth2 data structure can be used to store one or all of this information.

In some cases, the first user 302a can directly provide information regarding his associations, communications, and/or other content directly to the social media platform 150. In some cases, the social media platform 150 can retrieve some or all of the information regarding the first user's associates, communications, and/or other content from one or more third-party social media platforms. For example, the social media platform can retrieve content for the first social media alias 304a by accessing social media accounts 306a, 306b linked to the first social media alias 304a. As another example, the social media platform can retrieve content for the second social media alias 304b by accessing social media accounts 306b, 306c linked to the second social media alias 304b.

The first user's interactions with respect to one user alias are segregated from the other user alias. For example, as shown in FIG. 3B, the first user publishes a piece of information 308 using the first social media alias 304a (e.g., a "post" or other message can be seen by other users). This information 308 is shared amongst each of the users that are associated with the first user 302a through the first social media alias 304a (e.g., the user 302b, the user 302c, and the user 302d). Thus, to those users, it appears that a particular one of the first user's personas or identities (i.e., the first user's persona or identity associated with the first social media alias 304a) has published the information.

Similarly, the information 308 can be transmitted to third-party social media platforms for publication. For example, as shown in FIG. 3B, the information 308 can be shared using the social media account 306a and the social media account 306b linked to the first social media alias 304a. This can be useful, for example, as it enables the first user 302a to efficiently share information across multiple different social media platforms, without requiring that he manually and separately compose the information for each individual social media platform.

However, as shown in FIG. 3B, the information 308 is segregated to the first social media alias 304a. Thus, the information 308 is not shared with the users that are associated with the first user 302a through the second social media alias 304b (e.g., the user 302b, the user 302d, and the user 302e). Thus, to those users, it appears that no activity has occurred with respect to a particular one of the first user's personas or identities (i.e., the first user's persona or identity associated with the second social media alias 304b). Similarly, the information 308 is not transmitted to third-party social media platforms using the social media account 306c linked to the second social media alias 304b. Further, as the social media account 306b is linked to both the social media alias 304a, 304b, the information has already been transmitted to the social media account 306b via the social media alias 304a.

As noted above, the user's associates need not be mutually exclusive between social media aliases. For instance, in the example shown in FIG. 3B, the first user 302a has associated himself with the users 302b, 302d using both of the aliases 304a, 304b. To those users, the information 308 is presented according to the first social media alias 304a, but not according to the second social media alias 304b. Thus, the information 308 is selectively shared to other users with respect to one of the first user's personas or identities, while remaining segregated from the first user's other personas or identities.

In some cases, a user can selectively share information between multiple different social media aliases, such that the information is presented to multiple different audiences. An example of this functionality is illustrated in FIGS. 4A-4D.

Figure 4A:
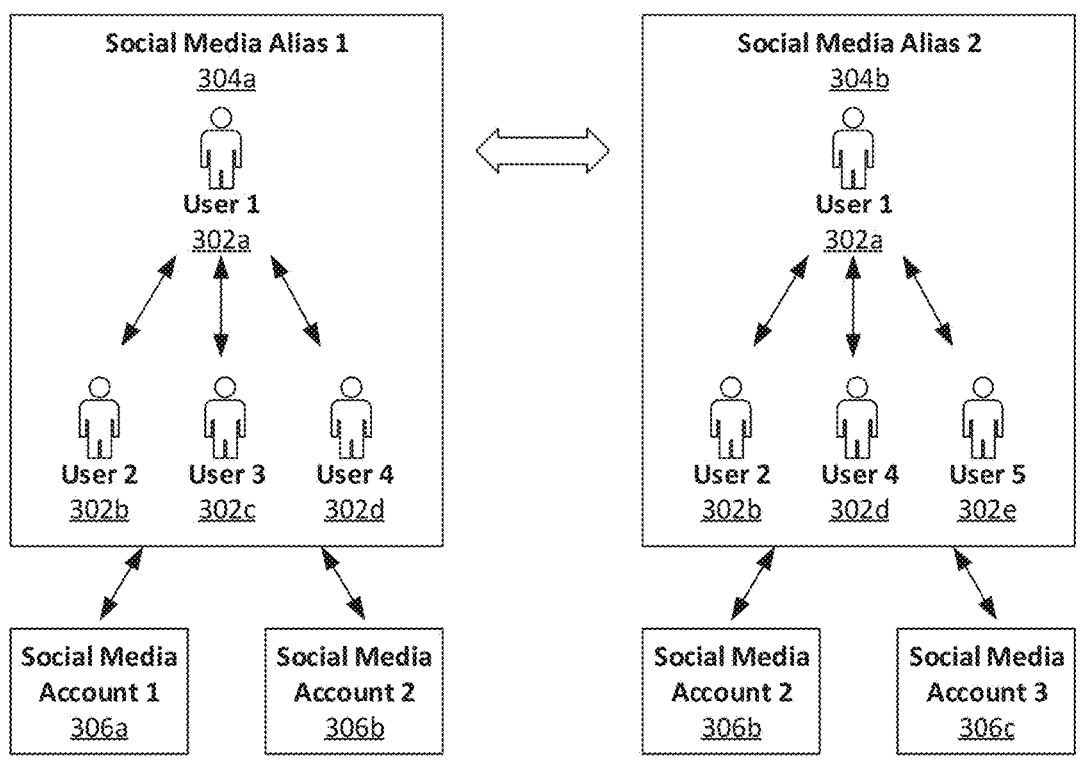
FIGS. 4A-4D are diagrams showing an example process of selectively sharing information between multiple different social media aliases.

As shown in FIG. 4A, and in a similar manner as described with respect to FIG. 3A, the first user 302a maintains two different social media aliases on the social media platform, a first social media alias 304a and a second social media alias 304b. The first user 302a can use the first social media alias 304a to associate himself with and communicate with a particular set of users (e.g., a user 302b, a user 302c, and a user 302d). Further, the first user 302a can publish content to the particular set of users. Similarly, the first user 302a can use the second social media alias 304b to associate himself with and communicate with a different set of users (e.g., the user 302b, the user 302d, and a user 302e). Further, the first user 302a can publish different content to the different set of users. Further, the first social media alias 304a is linked to a first user account 306a (e.g., a user account held by the first user 302a on a particular third-party social media platform), and to a second user account 306b (e.g., another user account held by the first user 302a on another third-party social media platform). Further, the second social media alias 304b also is linked to the second user account 306b and to a third user account 306c.

Figure 4B:
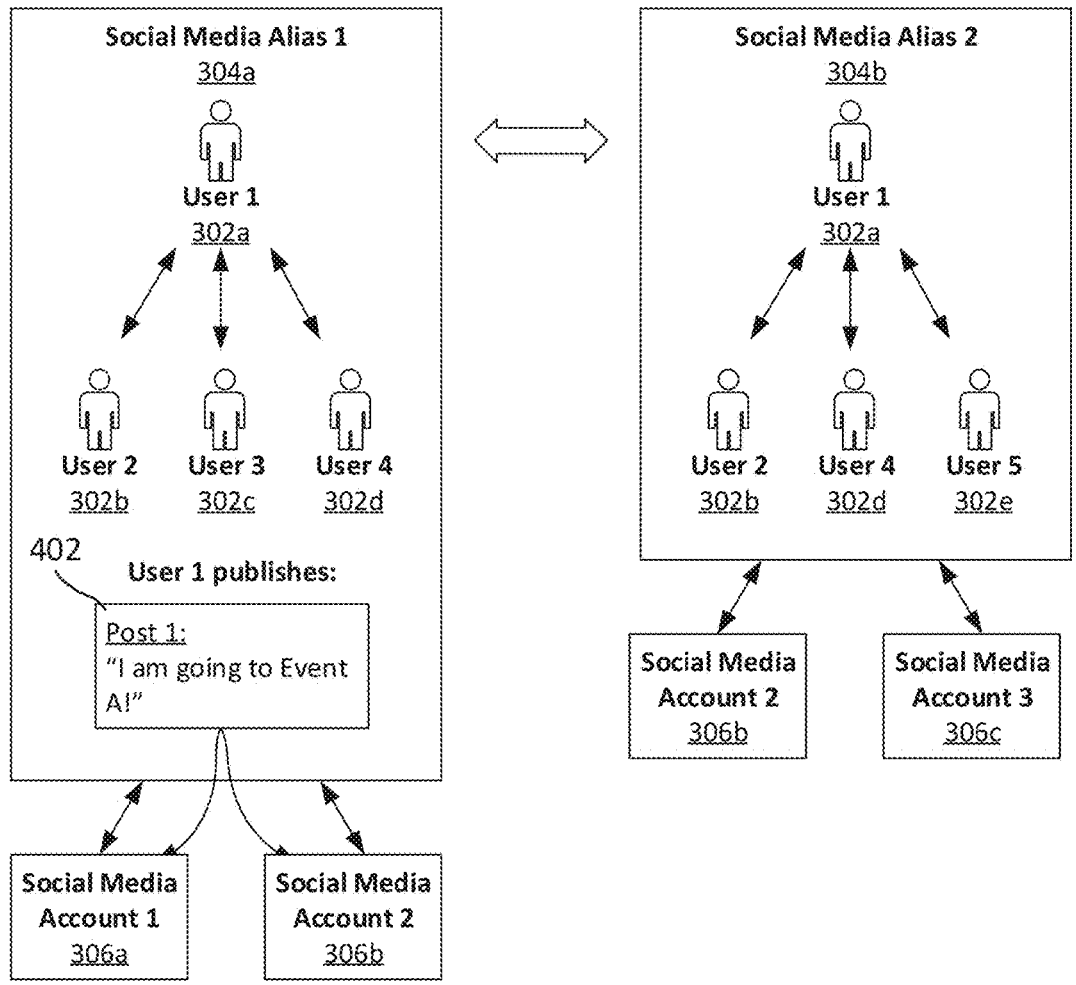

As shown in FIG. 4B, the first user publishes a piece of information 402 using the first social media alias 304a (e.g., a "post" or other message can be seen by other users). This information 402 is shared amongst each of the users that are associated with the first user 302a through the first social media alias 304a (e.g., the user 302b, the user 302c, and the user 302d). Thus, to those users, it appears that a particular one of the first user's personas or identities (i.e., the first user's persona or identity associated with the first social media alias 304a) has published the information. Similarly, the information 402 can be transmitted to third-party social media platforms for publication (e.g., via the social media accounts 306a, 306b).

As shown in FIG. 4B, the information 402 is segregated within the first social media alias 304a, such that the information 402 is not disseminated using the first user's other social media aliases. However, the first user 302a can instruct the social media platform 150 to selectively share the information 402 with one or more other social media aliases. This can be useful, for example, if the first user wishes to selectively publish certain information to multiple different audiences.

Figure 4C:
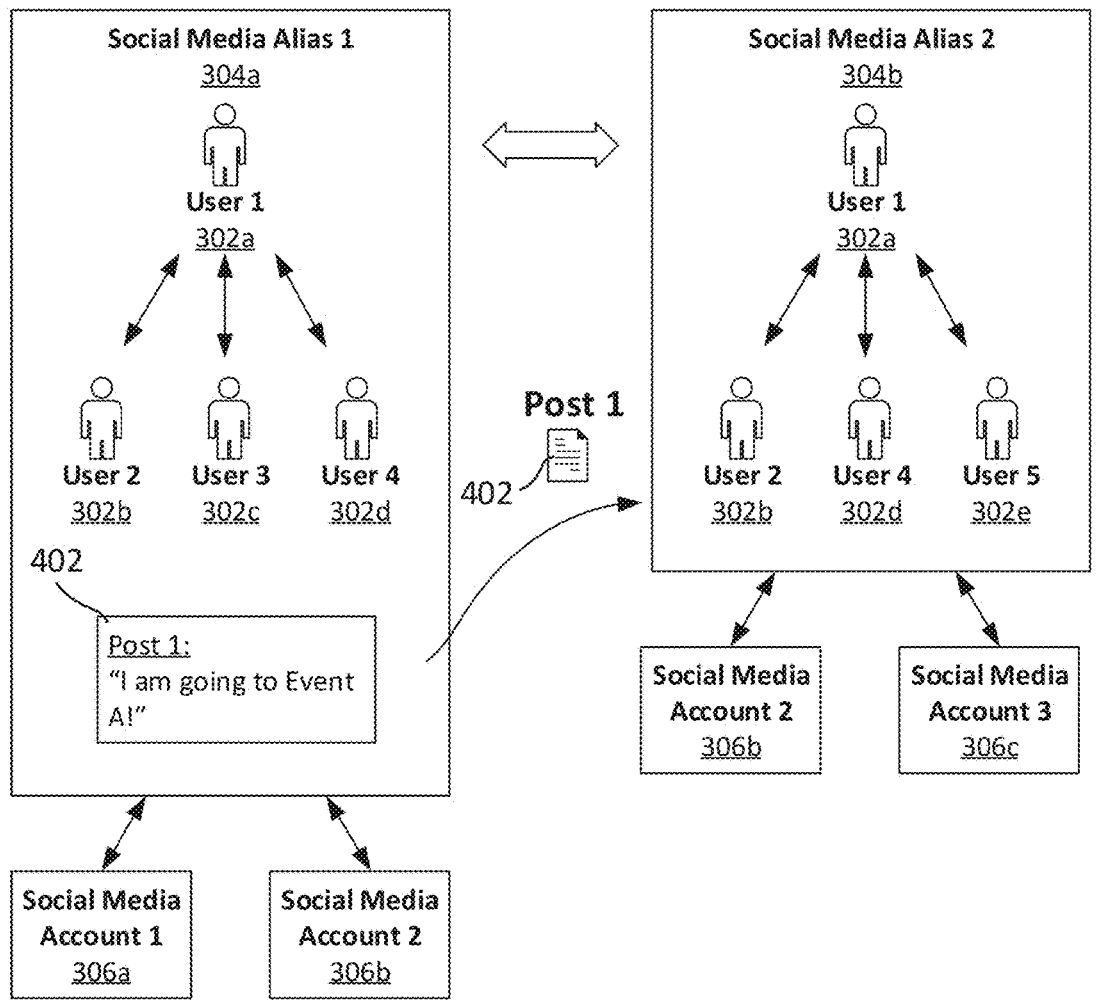

As an example, the user can instruct the social media platform 150 to share the information 402 with the social media alias 304b. As shown in FIG. 4C, in response, a copy of the information 402 is transmitted from the first social media alias 304a to the second social media alias 304b.

Figure 4D:
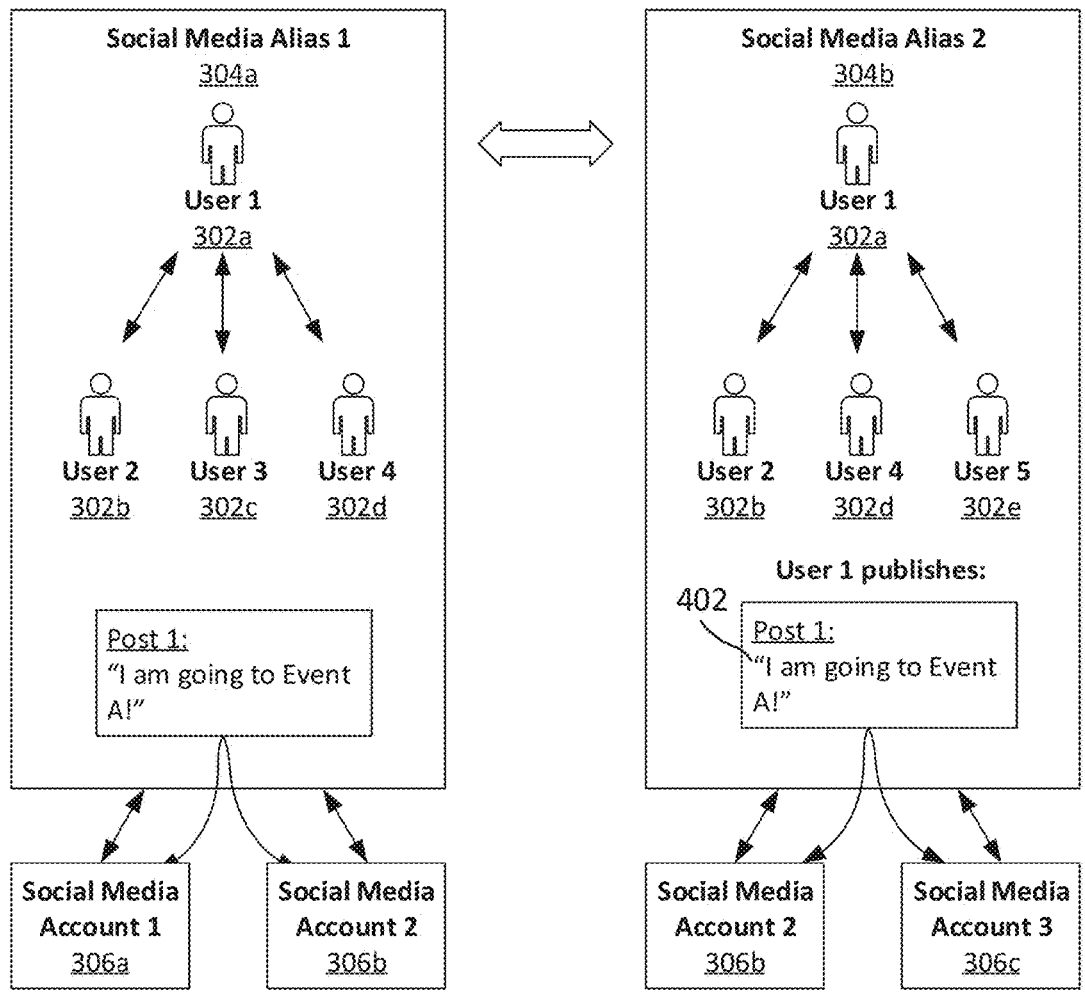

As shown in FIG. 4D, the copy of the information 402 is shared amongst each of the users that are associated with the first user 302a through second social media alias 304b (e.g., the user 302b, the user 302d, and the user 302e). Thus, to those users, it appears that another one of the first user's personas or identities (i.e., the first user's persona or identity associated with the second social media alias 304b) has published the information. Further, the copy of the information 402 can be transmitted to third-party social media platforms for publication (e.g., via the social media accounts 306b, 306c). In this manner, although the information 402 was originally segregated to a single social media alias (e.g., the social media alias 304a), the user can instruct the social media platform 150 to selectively share the information 402 with one or more other social media aliases (e.g., the social media alias 304b) such that the information 402 is selectively presented to a broader audience.

In some cases, a user can selectively transfer information from one social media alias to another. This can be useful, for instance, if the user wishes to respond or otherwise interact to information received with respect to one social media alias, but wishes to do so with respect to another social media alias. As an example, a user can receive an event invitation with respect to a "work" social media alias. The user wishes to attend, but does not want to publish this information to his work-based acquaintances (e.g., the event may be unrelated to work, the event is more appropriate for the user's personal acquaintances, the event is sensitive in nature, etc.). The user can selectively transfer the event invitation to a "personal" social media alias, and respond using that alias. Thus, he can respond to the invitation, without revealing his activities to his work-based acquaintances. An example of this functionality is illustrated in FIGS. 5A-5E.

Figure 5A:
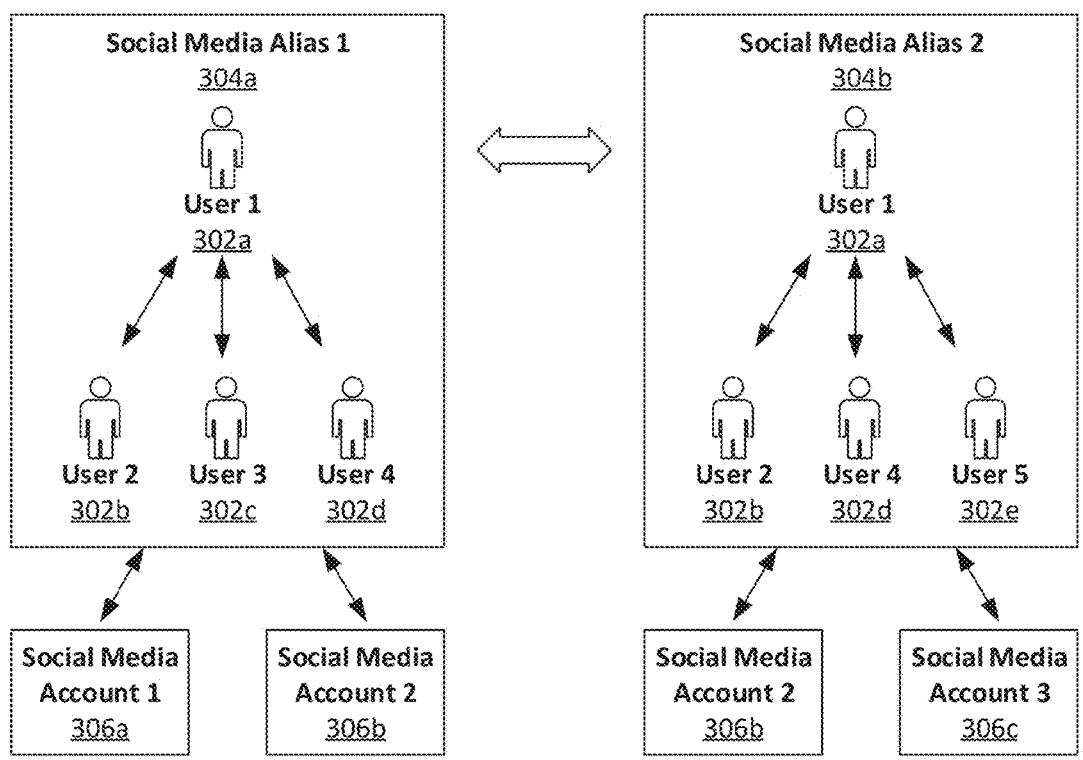
FIGS. 5A-5E are diagrams showing an example process of selectively transfer information from one social media alias to another.

As shown in FIG. 5A, and in a similar manner as described with respect to FIG. 3A, the first user 302a maintains two different social media aliases on the social media platform, a first social media alias 304a and a second social media alias 304b. The first user 302a can use the first social media alias 304a to associate himself with and communicate with a particular set of users (e.g., a user 302b, a user 302c, and a user 302d). Further, the first user 302a can publish content to the particular set of users. Similarly, the first user 302a can use the second social media alias 304b to associate himself with and communicate with a different set of users (e.g., the user 302b, the user 302d, and a user 302e). Further, the first user 302a can publish different content to the different set of users. Further, the first social media alias 304a is linked to a first user account 306a (e.g., a user account held by the first user 302a on a particular third-party social media platform), and to a second user account 306b (e.g., another user account held by the first user 302a on another third-party social media platform). Further, the second social media alias 304b is also linked to the second user account 306b and to a third user account 306c.

Figure 5B:
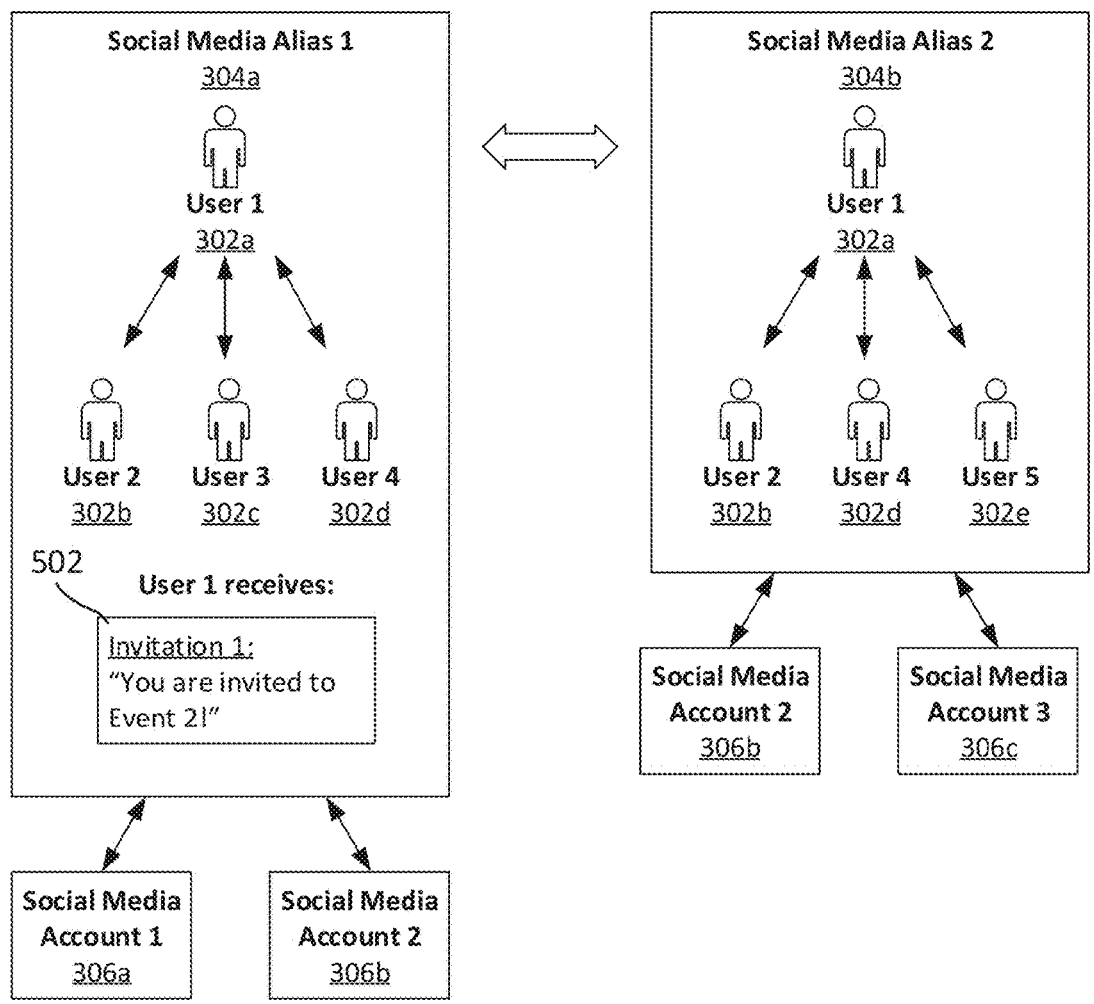

As shown in FIG. 5B, the first user receives a piece of information 502 via the first social media alias 304a (e.g., an invitation to an event). As shown in FIG. 5B, the information 502 is segregated within the first social media alias 304a.

The first user wishes to interact with the information 502 (e.g., discuss the event invitation with other users, accept the event invitation, invite other users to the event, or otherwise interact with the event invitation). However, the user does not wish to do so with respect to the first social media alias 304a, and instead would like to do so with respect to another social media alias (e.g., the second social media alias 304b). Thus, the first user 302a can instruct the social media platform 150 to transfer the information 502 to one or more other social media aliases.

Figure 5C:
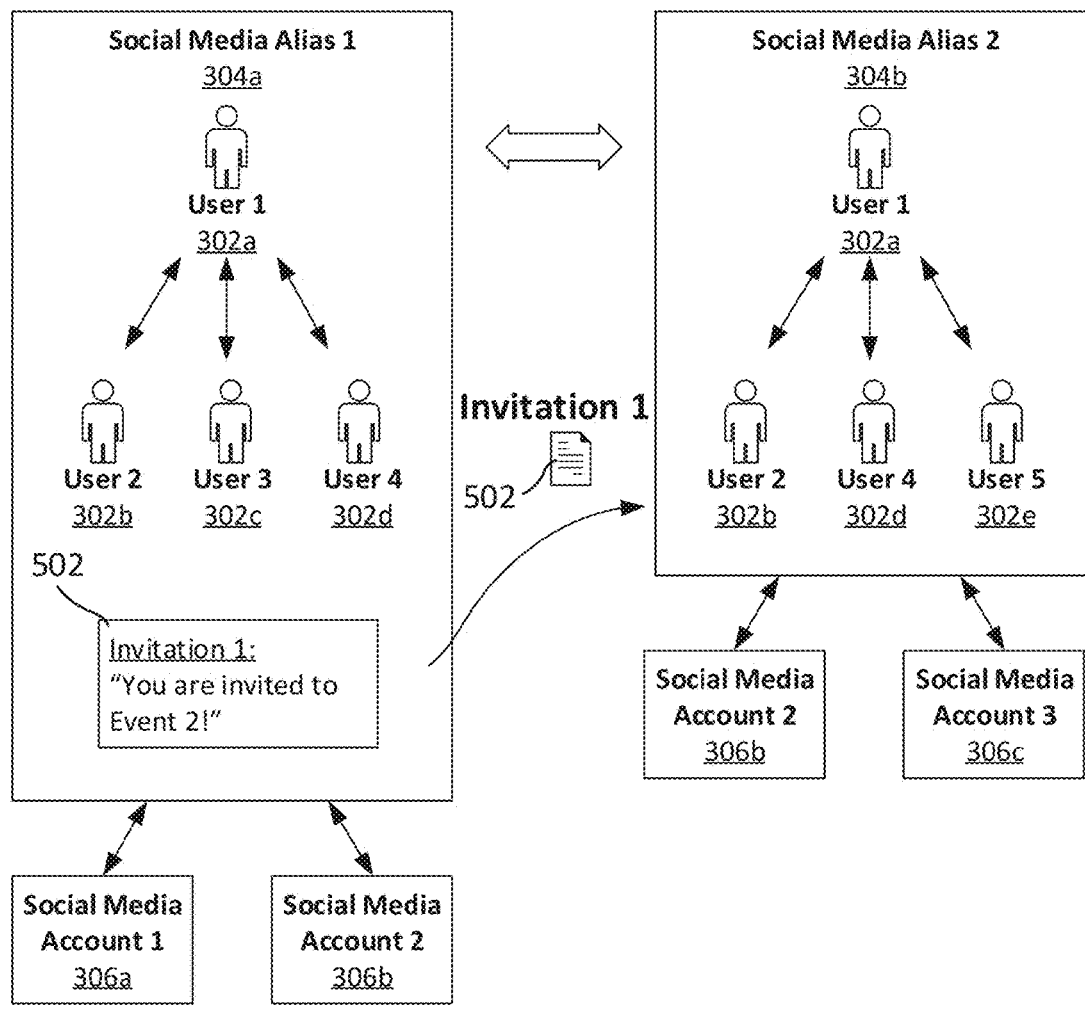

As an example, the user can instruct the social media platform 150 to share the information 502 with the social media alias 304b. As shown in FIG. 5C, in response, a copy of the information 502 is transmitted from the first social media alias 304a to the second social media alias 304b.

Figure 5D:
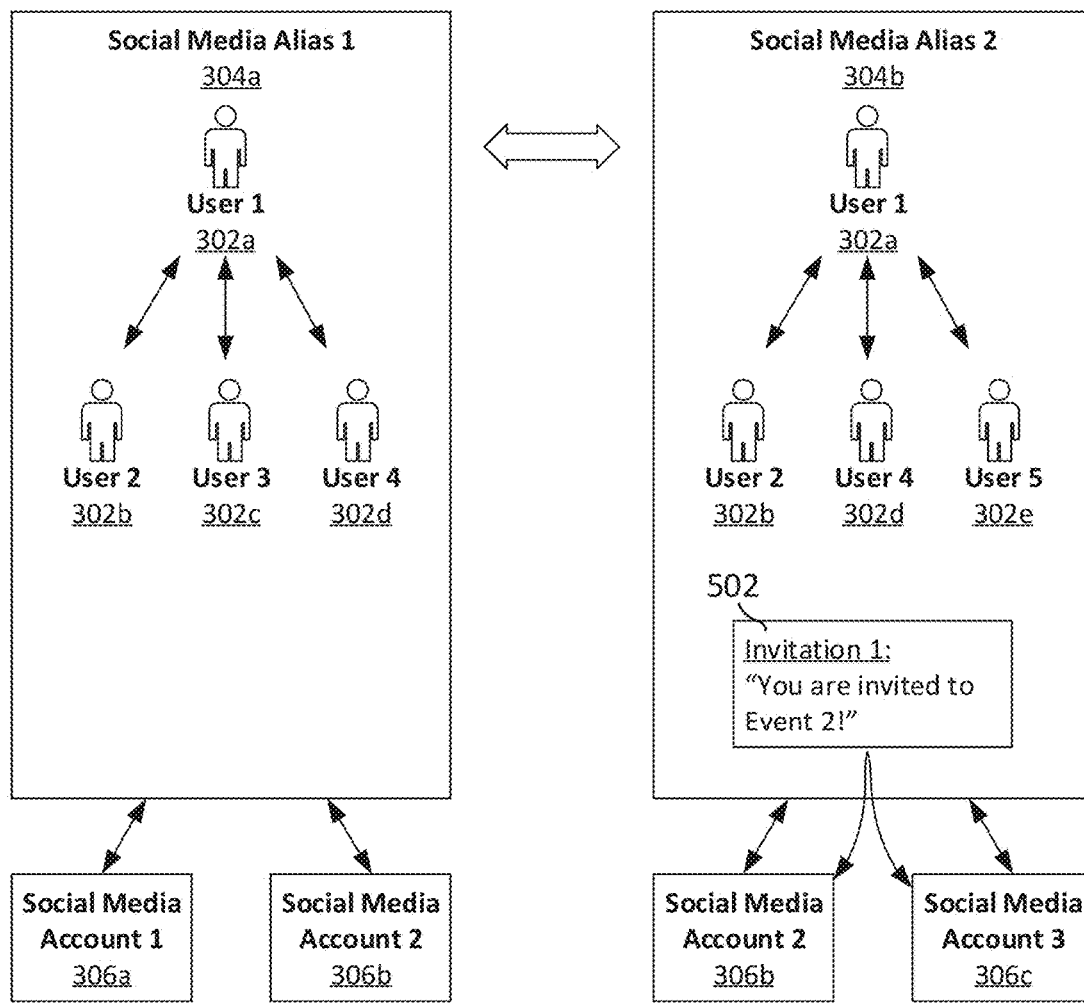

As shown in FIG. 5D, the copy of the information 502 is stored with respect to the second social media alias 304b. Further, the information 502 is removed with respect to the first social media alias 304a. Thus, the information 502 is transferred or "migrated" between the social media aliases 304a and 304b. In some cases, records regarding the information 502 can be deleted from a database associated with the first social media alias 304a, and the information can be added to another database associated with the second social media alias 304b. In some cases, records regarding the information 502 can be modified, such that it identifies the second social media alias 304b instead of the first social media alias 304a.

Further, the copy of the information 502 can be transmitted to third-party social media platforms for publication (e.g., via the social media accounts 306b, 306c). In this manner, although the information 502 was originally received using a first social media alias (e.g., the social media alias 304a), the user can instruct the social media platform 150 to selectively transfer or migrate the information 502 to one or more other social media aliases (e.g., the social media alias 304b).

Figure 5E:
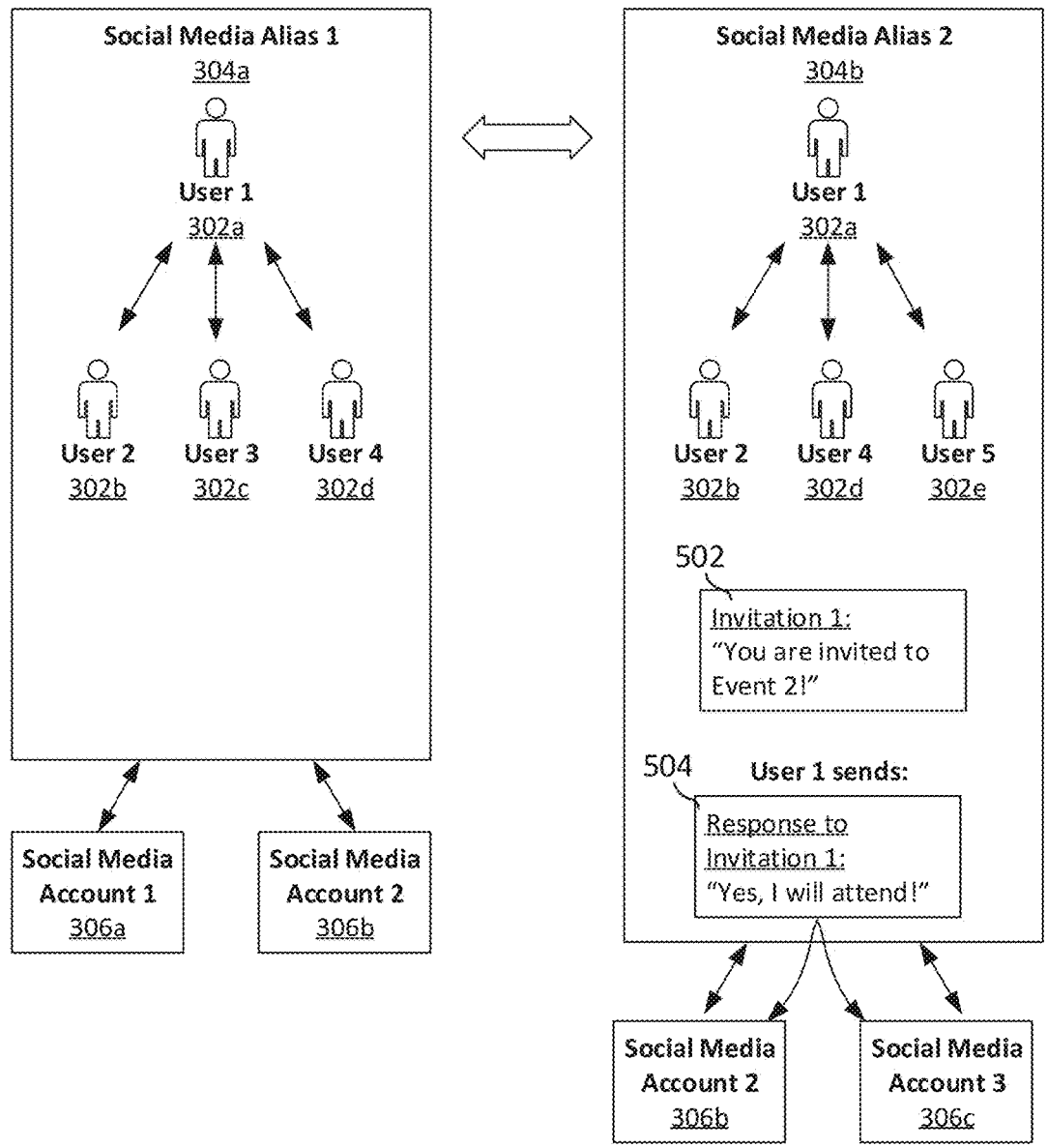

The first user 302a can interact with the information 502 using the social media alias 304b. For example, as shown in FIG. 5E, the first user 302b can publish a response 504 to the information 502 (e.g., a response accepting the invitation). The response 504 is shared amongst each of the users that are associated with the first user 302a through second social media alias 304b (e.g., the user 302b, the user 302d, and the user 302e). Thus, to those users, it appears that a particular one of the first user's personas or identities (i.e., the first user's persona or identity associated with the second social media alias 304b) is responding to the information 502. Similarly, the response 504 can be transmitted to third-party social media platforms for publication (e.g., via the social media accounts 306b, 306c). In this manner, although the information 402 was originally transmitted to the first user 302a via one of his social media aliases (e.g., the social media alias 304a), the user can transfer or migrate the information to another social media alias (e.g., the social media alias 304b), and interact with the information as if it had been originally sent to the second social media alias. Thus, the user can interact on the social media platform, without revealing his activities to certain selected audiences.

In some cases, the social media platform 150 can restrict the transfer or migration of information between social media aliases. For example, in some cases, the social media platform 150 can enable the transfer or migration of information that has been deemed publicly accessible by the originator of the information. In contrast, the social media platform 150 can disable the transfer or migration of information that has been deemed private or share-restricted by the originator of the information.

As an example, a user can create a first event invitation using the social media platform 150, and specify that the first event invitation can be publicly distributed to other users (e.g., a public or "open" event invitation). Further, the user can create a second event invitation using the social media platform 150, and specify that the second event invitation is limited to a select group of invitees (e.g., a private or "closed" event invitation). Recipients of the first event invitation can freely transfer or migrate the event invitation to his other social media aliases, and interact with the event invitation (e.g., respond to the event invitation) using a different social media account. However, Recipients of the second event invitation cannot transfer or migrate the event invitation to his other social media aliases. Thus, the creator of the event invitation can continue control the dissemination of information to other users, even after the information has been initially distributed.

The social media platform 150 can indicate a transfer-restricted event in various ways. In some cases, the social media platform 150 can present a notification element on a user interface (e.g., an error message or pop-up notification) when a user attempts to transfer a transfer-restricted event. In some cases, for information that can be transferred, the social media platform 150 can present an option for transferring information to the user. For information that is transfer-restricted, the social media platform 150 can withhold the option for transferring information from the user (e.g., by not displaying the option, not allowing the user to select the option, visually deemphasizing the option, etc.).

As shown in FIGS. 5A-5E, a user can transfer or migrate an event invitation between social media aliases. However, the transfer or migration or information is not limited solely to event invitations. For example, in some cases, a first user can transfer or migrate a message (e.g., a chat message, a "post," an e-mail, or other message) received from a second user between social media aliases, such that the first user can carry on a conversation with the second user without revealing his activities to others.

In some cases, a user can transfer or migrate information that he had sent to one or more other users. As an example, a user can initially transmit a message to another user using a first social media alias. After transmission, the user can transfer or migrate the message from the first social media alias to a second social media alias, and continue the conversation using the second social media alias. However, to the recipient, it appears as though the message had been originally transmitted using the user's second social media alias. This can be useful, for example, if the user accidentally used the incorrect social media alias for the initial transmission, or otherwise believes that the message is more appropriate for another social media alias after transmission. Thus, the user can transfer or migrate the message seamlessly between social media alias, an in a manner that is transparent to other users. An example of this functionality is illustrated in FIGS. 6A-6D.

Figure 6A:
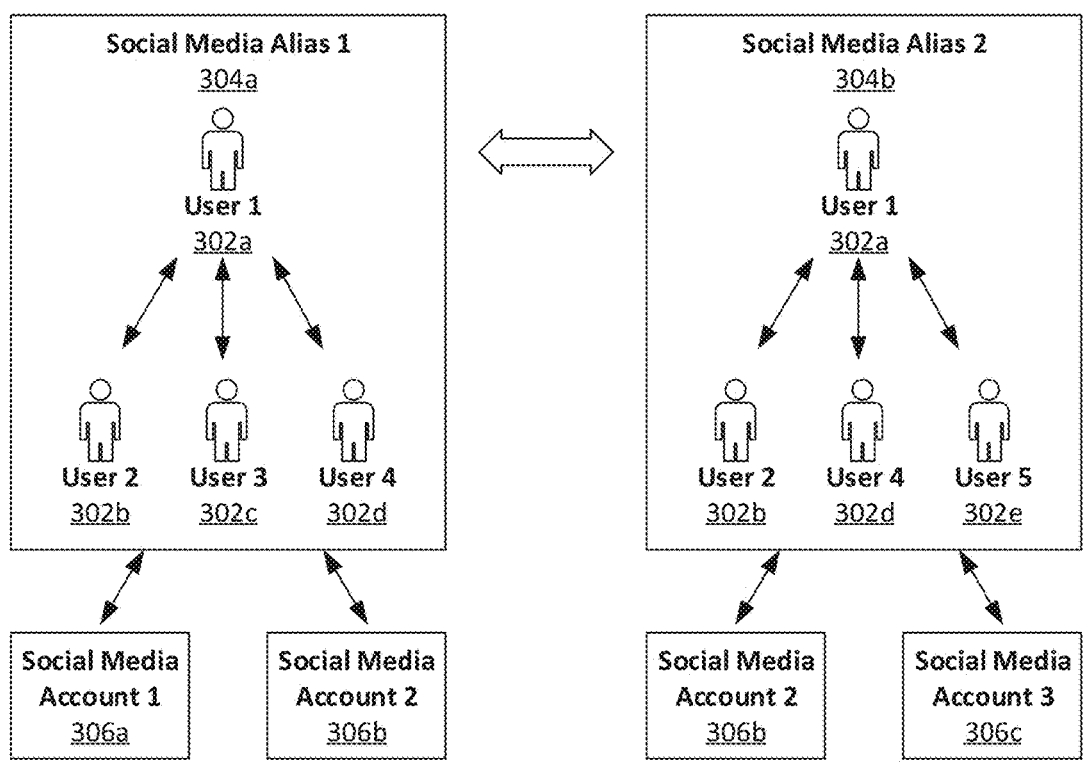
FIGS. 6A-6D are diagrams showing an example processing of transferring or migrate information that a user had sent to other users, from one social media alias to another.
Figure 6B:
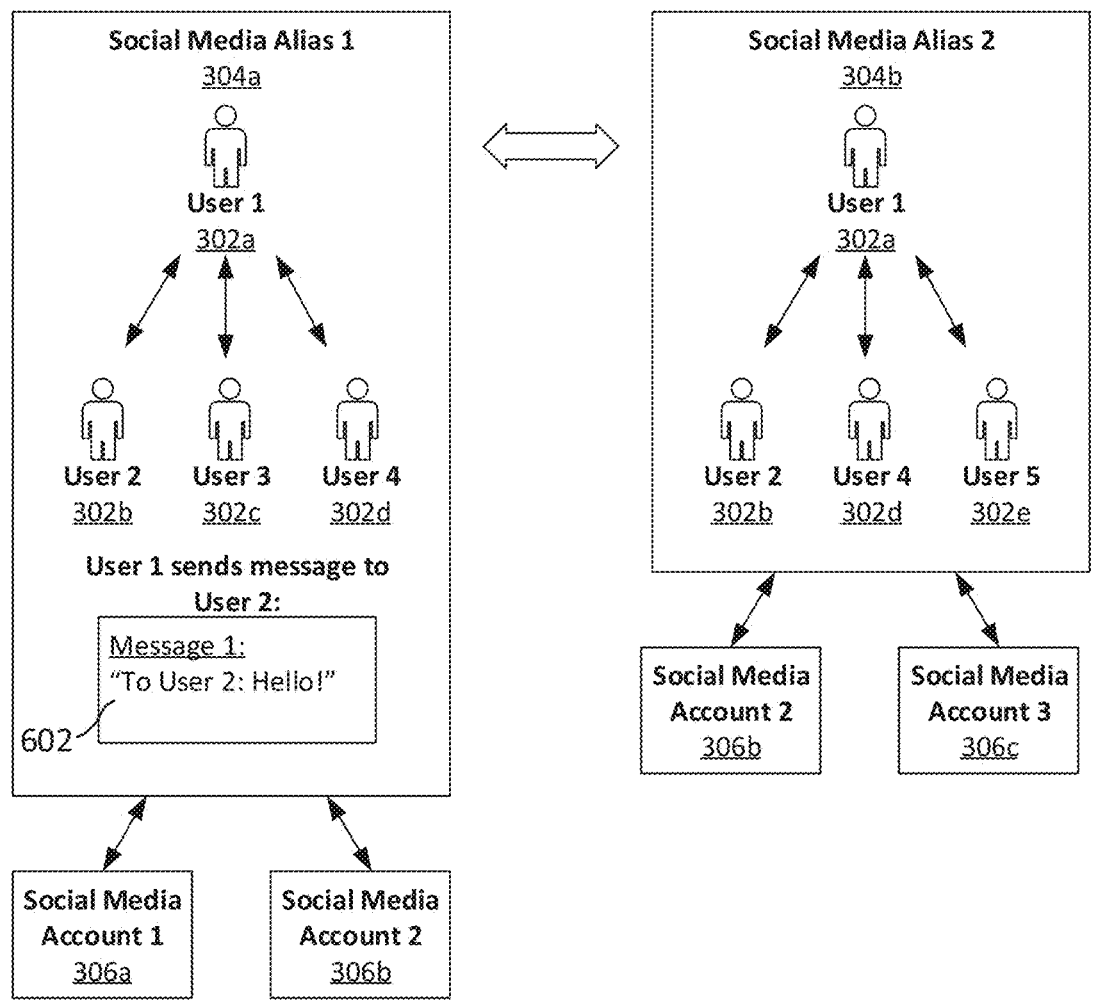

As shown in FIG. 6A, and in a similar manner as described with respect to FIG. 3A, the first user 302a maintains two different social media aliases on the social media platform, a first social media alias 304a and a second social media alias 304b. The first user 302a can use the first social media alias 304a to associate himself with and communicate with a particular set of users (e.g., a user 302b, a user 302c, and a user 302d). Further, the first user 302a can publish content to the particular set of users. Similarly, the first user 302a can use the second social media alias 304b to associate himself with and communicate with a different set of users (e.g., the user 302b, the user 302d, and a user 302e). Further, the first user 302a can publish different content to the different set of users. Further, the first social media alias 304a is linked to a first user account 306a (e.g., a user account held by the first user 302a on a particular third-party social media platform), and to a second user account 306b (e.g., another user account held by the first user 302a on another third-party social media platform). Further, the second social media alias 304b is also linked to the second user account 306b and to a third user account 306c. As shown in FIG. 6B, the first user transmits a piece of information 602 via the first social media alias 304a (e.g., a message to the user 302b). As shown in FIG. 6B, the information 602 is segregated within the first social media alias 304a.

After transmission, the user wishes to continue his interactions with the user 302b (e.g., send additional messages to the second user 302b, respond to messages from the second user 302b, etc.). However, the user does not wish to do so with respect to the first social media alias 304a, and instead would like to do so with respect to another social media alias (e.g., the second social media alias 304b). Thus, the first user 302a can instruct the social media platform 150 to transfer the information 602 to one or more other social media aliases.

Figure 6C:
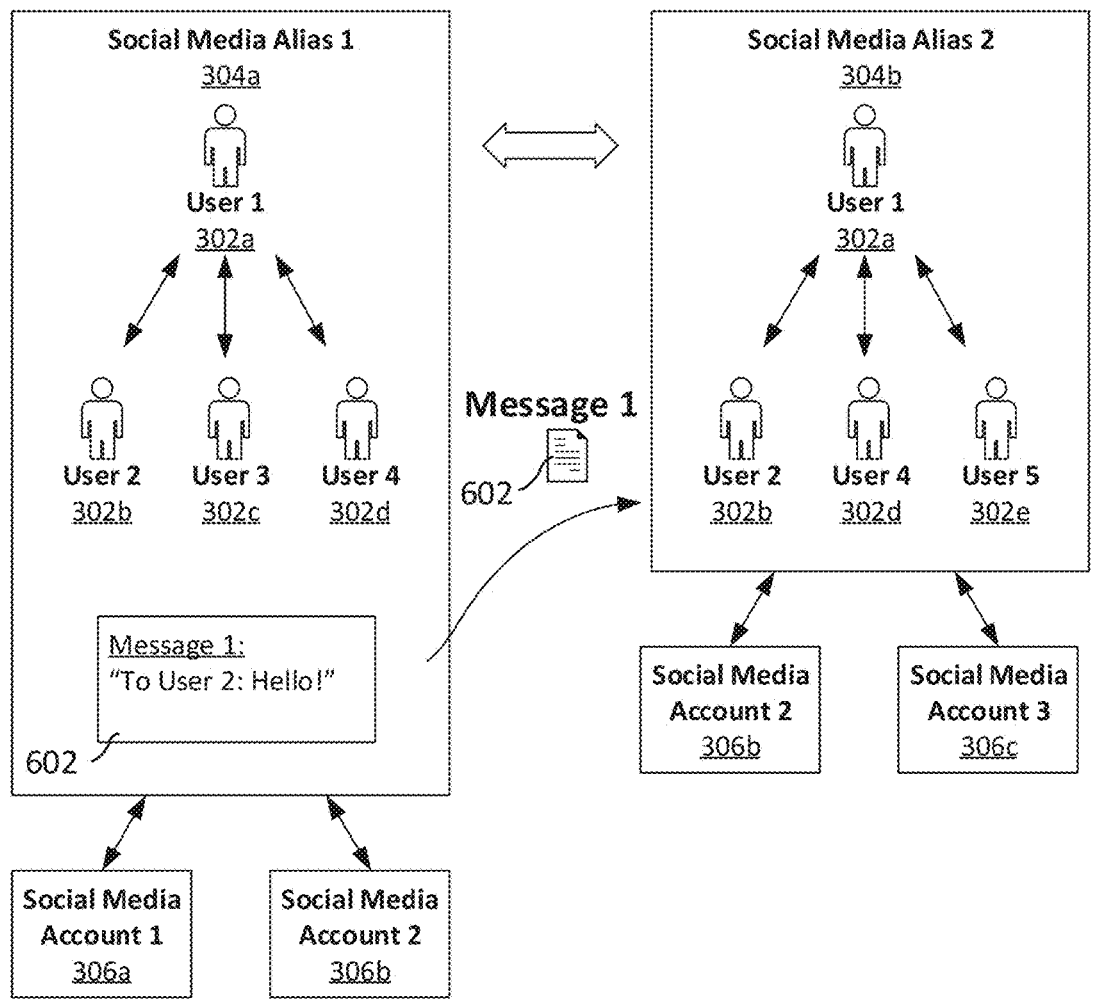

As an example, the user can instruct the social media platform 150 to share the information 602 with the social media alias 304b. As shown in FIG. 6C, in response, a copy of the information 602 is transmitted from the first social media alias 304a to the second social media alias 304b.

Figure 6D:
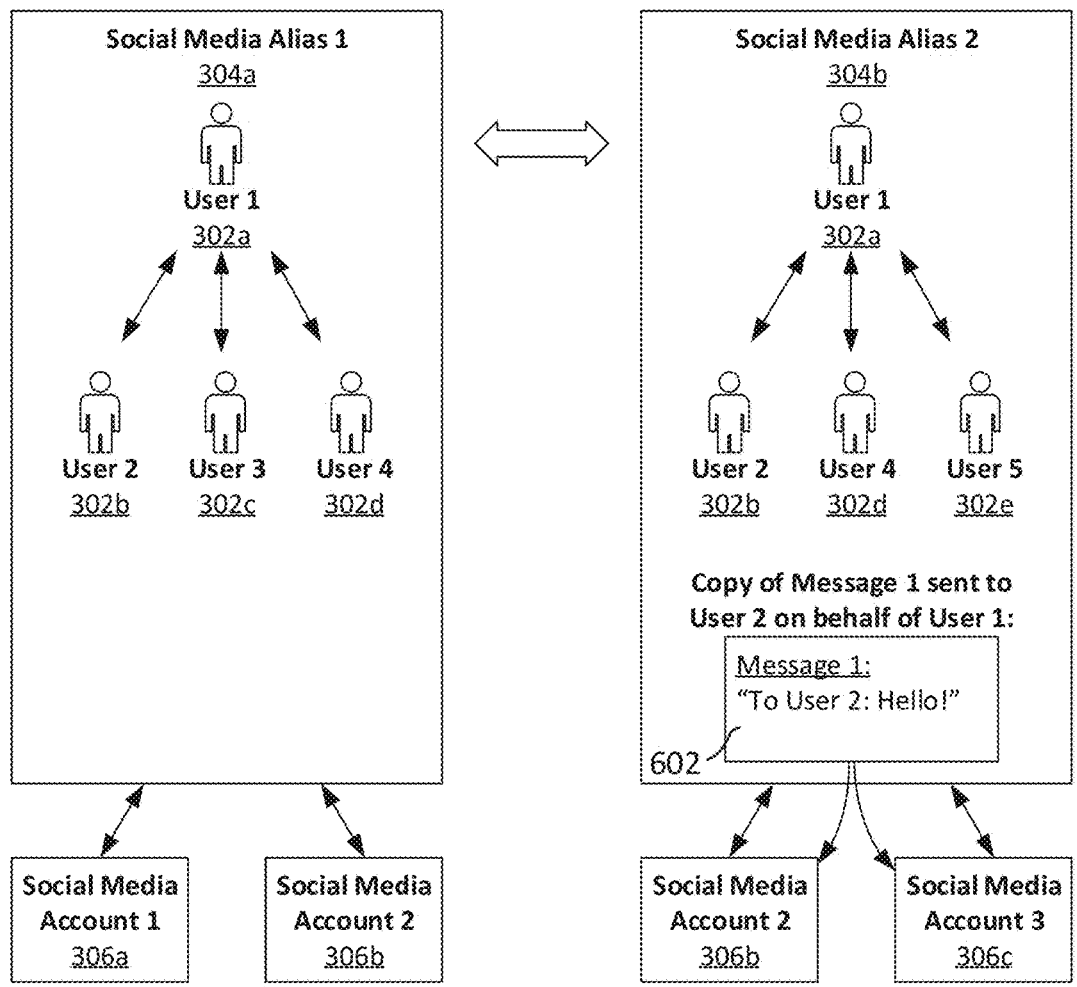

As shown in FIG. 6D, the copy of the information 602 is stored with respect to the second social media alias 304b. Further, the information 602 is removed with respect to the first social media alias 304a. Thus, the information 602 is transferred or "migrated" between the social media aliases 304a and 304b. Further, the copy of the information 602 can be transmitted to third-party social media platforms for publication (e.g., via the social media accounts 306b, 306c). In this manner, although the information 602 was originally transmitted using a first social media alias (e.g., the social media alias 304a), the user can instruct the social media platform 150 to selectively transfer or migrate the information 602 to one or more other social media aliases (e.g., the social media alias 304b).

Similarly, the information 602 can be modified to reflect the migration. For example, the information 602 can be revised to indicate that it was transmitted using the first user's second social media alias 304b. This can be performed in a manner that is transparent to the user 302b. For example, although the user 302b previously received a copy of the information 602 (e.g., a copy of the message that was transmitted to him) indicating that it originated from the first user's first social media alias 304a, his copy of the information 602 can be subsequently modified to instead indicate that it originated from the first user's second social media alias 304b. In some cases, this can be performed without informing the user 302b of the change, or without alerting the user 302b to the change. Thus, the user 302b can continue interacting with the information 602, as if it had been originally transmitted by the second social media alias.

For example, the user 302b can respond to the information 602 (e.g., by composing a message in response), and a copy of the response can be transmitted to the first user 302a via the first user's second social media alias 304b, without requiring the user 302b to manually select a new recipient for the response. In this manner, a user can retroactively migrate information between social media alias to future protect his privacy, without disrupting his previous interactions with others.

As described herein, users can interact with the social media platform 150 using a user interface presented by the social media platform 150. Example user interfaces (e.g., the user interfaces 700, 800, 900, and 1000) are described below. In some cases, the user interfaces described herein can be implemented as a part of the user interfaces 112a-c shown in FIG. 1.

Figure 7A:
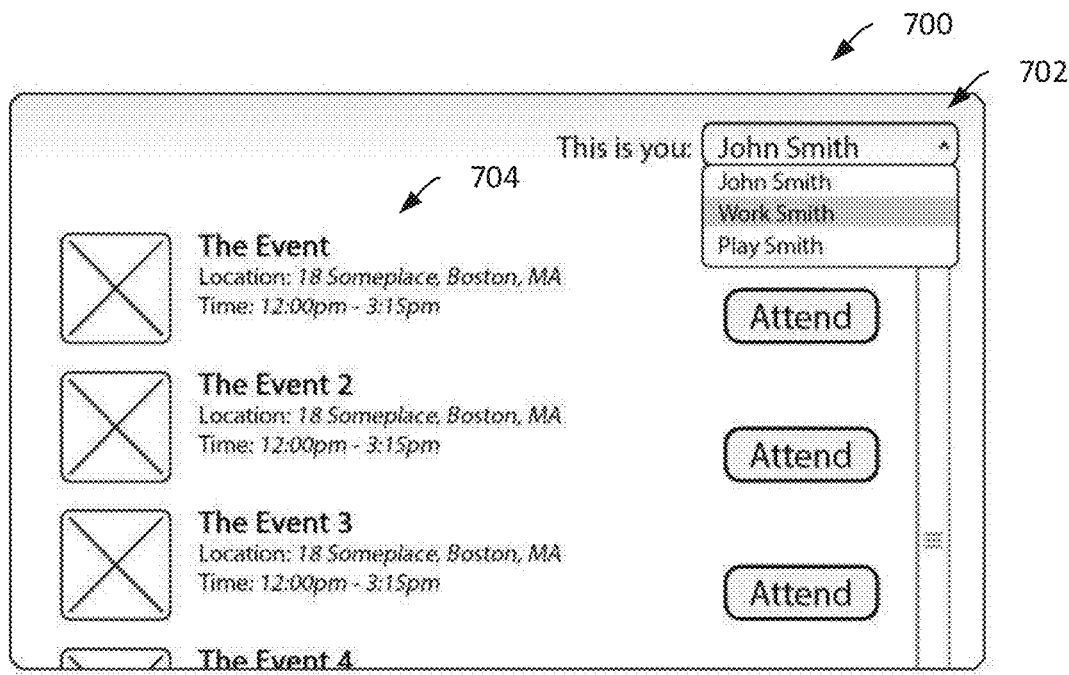
FIGS. 7A, and 7B show an example user interface enabling a user to switch between social media aliases.
Figure 7B:
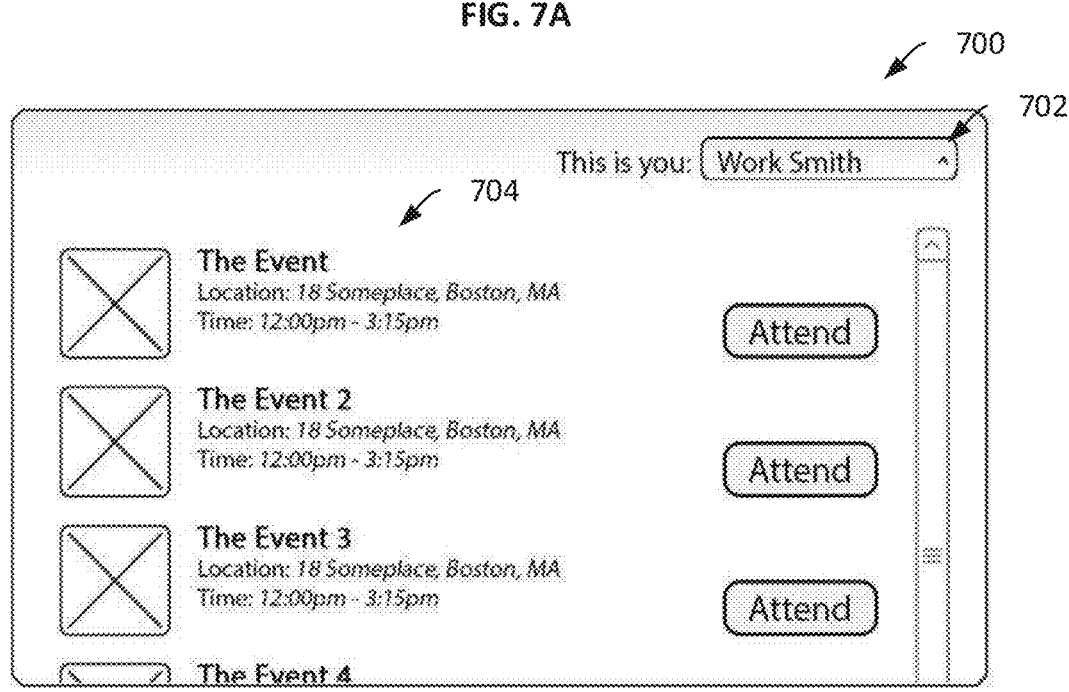

An example user interface 700 enabling a user to switch between social media aliases is shown in FIGS. 7A and 7B. The user interface 700 includes an alias selection element 702 (e.g., a selection list, drop down bar, or other UI element). The alias selection element 702 displays a user's currently selected social media alias (e.g., "John Smith"), as well as any additional social media aliases that have been linked to the currently selected social media alias (e.g., "Work Smith" and "Play Smith").

The user interface 700 also includes a content portion 704 that presents content associated with the selected social media alias. For example, as shown in FIG. 7A, the content portion 704 presents several event invitations that had been transmitted to a particular user with respect to one of the user's social media aliases. Using the content portion 704, the user can examine information regarding the events, and respond to the event (e.g., by selecting the "Attend" screen element to indicate that he is planning on attending the event). If the user chooses to respond to the event, the social media platform can present the response to one of the other users (e.g., transmit a message to the event administrator and/or other users), and attribute the response to the user's selected social media alias.

The user can quickly switch between different social media aliases using the alias selection element 702. For example, as shown in FIG. 7B, the user can select one of the linked social media aliases (e.g., "Work Smith"). Subsequently, the user can respond to the event (e.g., by selecting the "Attend" screen element to indicate that he is planning on attending the event). If the user chooses to respond to the event, the social media platform can present the response to one of the other users, and attribute the response to the user's newly selected social media alias.

In the example shown in FIGS. 7A and 7B, the content shown in the content portion 704 did not change when the user selected a new social media alias. In some cases, however, the content portion 704 can change to reflect content to reflect the selection. For example, the content portion 704 can add additional information that is associated with the newly selected social media alias, and remove content that is not associated with the newly selected social media alias.

Figure 8A:
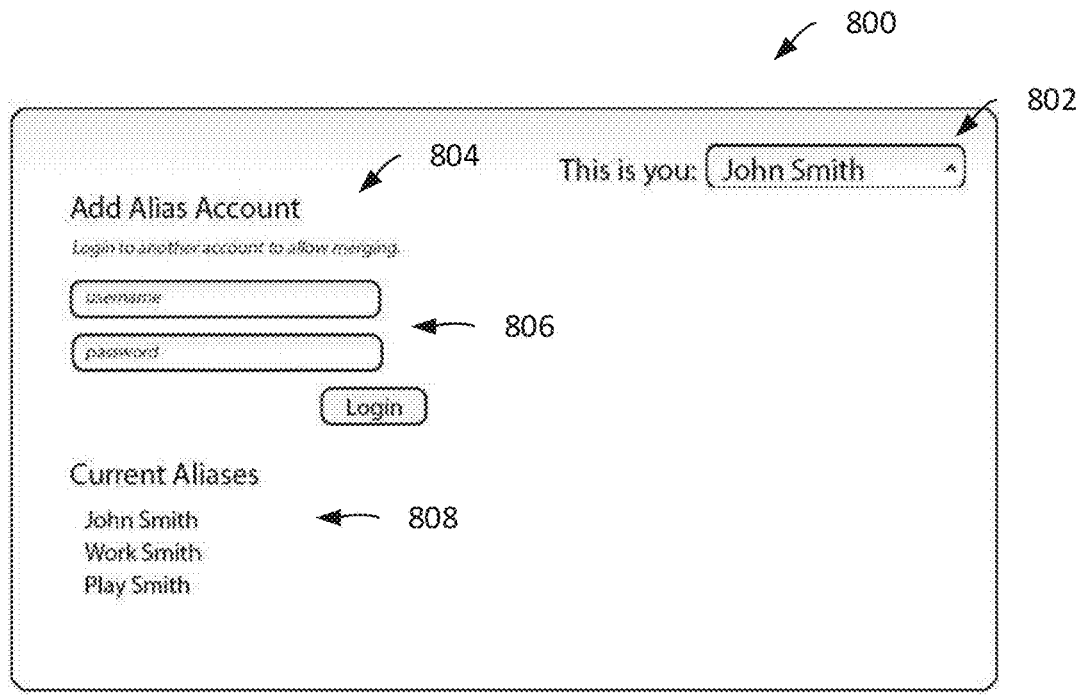
FIGS. 8A, and 8B show an example user interface enabling a user to link social media aliases.
Figure 8B:
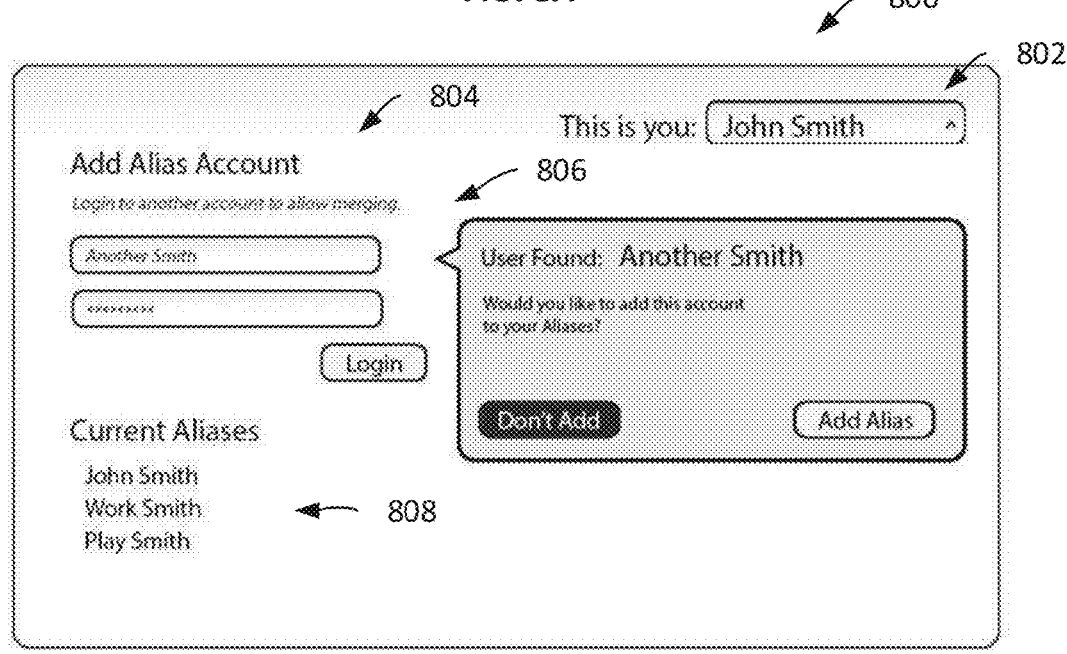

An example user interface 800 enabling a user to link social media aliases is shown in FIGS. 8A and 8B. In a similar manner as the example shown in FIGS. 7A and 7B, the user interface 800 includes an alias selection element 802 (e.g., a selection list, drop down bar, or other UI element). The alias selection element 802 displays a user's currently selected social media alias, as well as any additional social media aliases that have been linked to the currently selected social media alias. The user can view the currently selected social media alias and/or selected a different linked social media alias using the alias selection element 802.

The user interface 800 also includes an alias linking portion 804. The alias linking portion 804 enables the user to link additional social media aliases to the currently selected alias. For example, as shown in FIG. 8A, the alias linking portion 804 can include authentication screen elements 806 that enable a user to enter his authentication credentials associated with the social media alias that he wishes to link to the currently selected social media alias (e.g., user name, password, or other credentials). The alias linking portion 804 also displays each of the currently linked social media aliases (e.g., in a list element 808), such that the user can readily determine which social media aliases have already been linked together.

As shown in FIG. 8B, if the user successfully enters his authentication credentials into the authentication screen elements 806, the user interface 800 updates to inform the user that a social media alias matching the inputted credentials has been found. The user can subsequently confirm that the new social media alias be linked to the currently selected social media alias, or decline to link the new social media alias. In some cases, when the user confirms that the new social media alias should be linked, the social media platform can automatically link the new social media alias to the currently selected social media alias, as well as to each other linked social media aliases (e.g., each of the social media aliases shown in the list element 808).

Figure 9A:
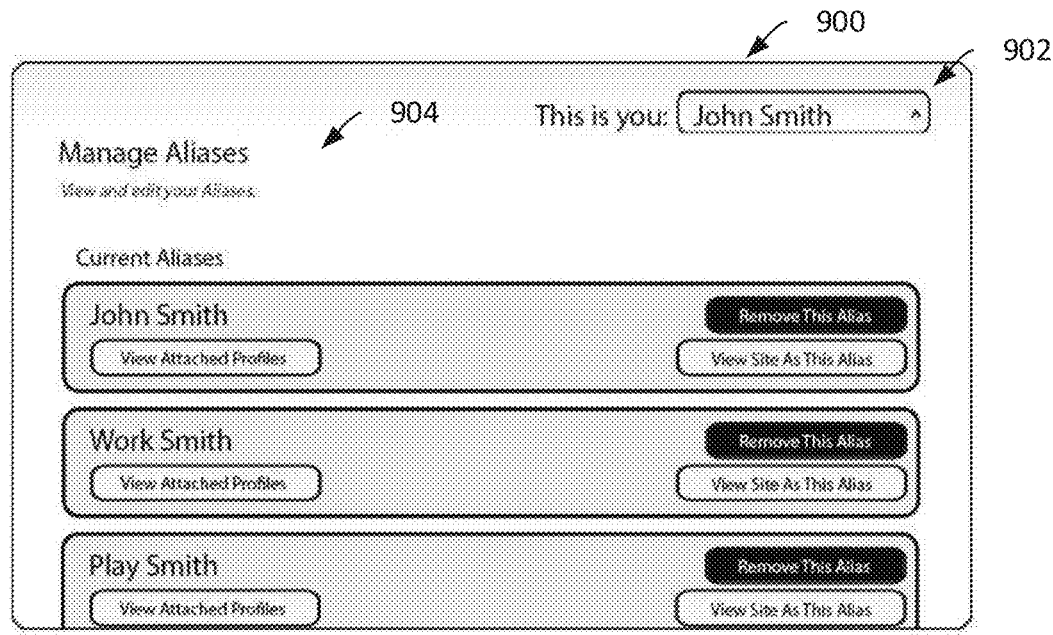
FIGS. 9A, and 9B show an example user interface enabling a user to manage multiple social media aliases.
Figure 9B:
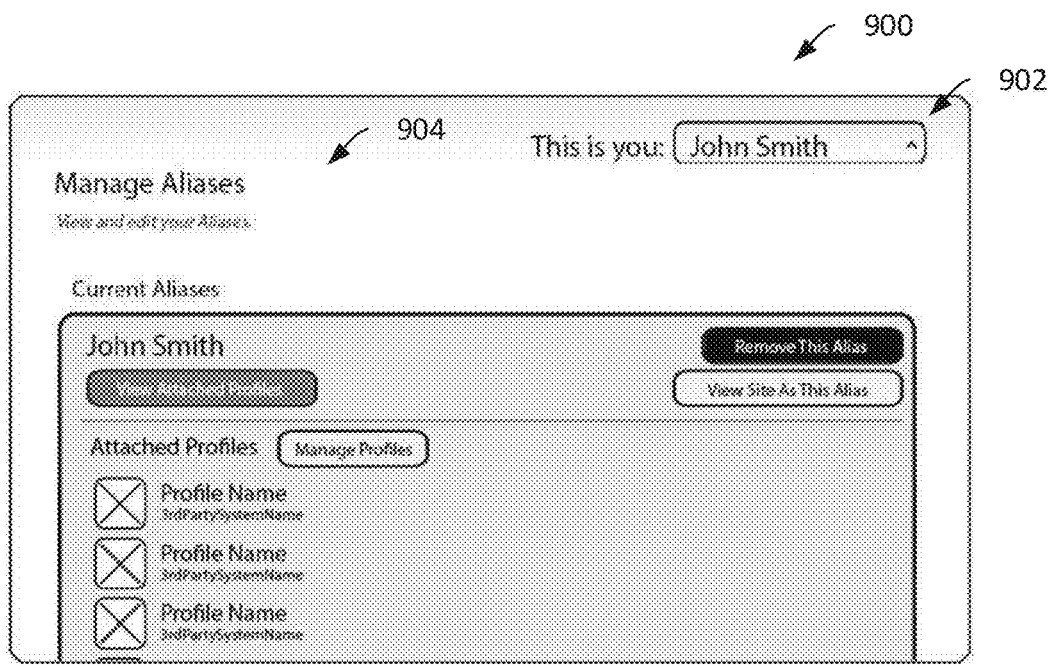

An example user interface 900 enabling a user to manage multiple social media aliases is shown in FIGS. 9A and 9B. In a similar manner as the example shown in FIGS. 7A and 7B, the user interface 900 includes an alias selection element 902 (e.g., a selection list, drop down bar, or other UI element). The alias selection element 902 displays a user's currently selected social media alias, as well as any additional social media aliases that have been linked to the currently selected social media alias. The user can view the currently selected social media alias and/or selected a different linked social media alias using the alias election element 902.

The user interface 900 also includes an alias management portion 904. The alias management portion 904 displays the currently selected social media alias, as well as each of the linked social media aliases. Using the alias management portion 904, the user can instruct the social media platform to remove a particular linked social media alias from the group of linked social media aliases (e.g., by selecting a "Remove This Alias" command). In response, the social media platform removes the links between the selected social media aliases and the other social media aliases. However, the social media platform does not delete the selected social media alias. This can be useful, for example, as it enables the user to continue to use the unlinked social media alias (e.g., independently of the other social media aliases).

The user can also instruct the social media platform to display content according to a particular social media alias (e.g., by selecting the "View Site As This Alias" command). In response, the social media platform updates the user interface to present information according to the selected social media alias. This result can be similar to the user selecting a particular social media alias from the alias selection element 902.

The user can also instruct the social media platform to display profiles (e.g., accounts on third-party social media platforms) associated with or "attached to" a particular social media alias (e.g., by selecting the "View Attached Profiles" command). As shown in FIG. 9B, in response, the user interface 900 updates to display the attached profiles. The user can manage the profiles (e.g., add profiles, delete profiles, change authentication information associated with profiles, etc.) by selecting the "Manage Profiles" command.

Figure 10A:
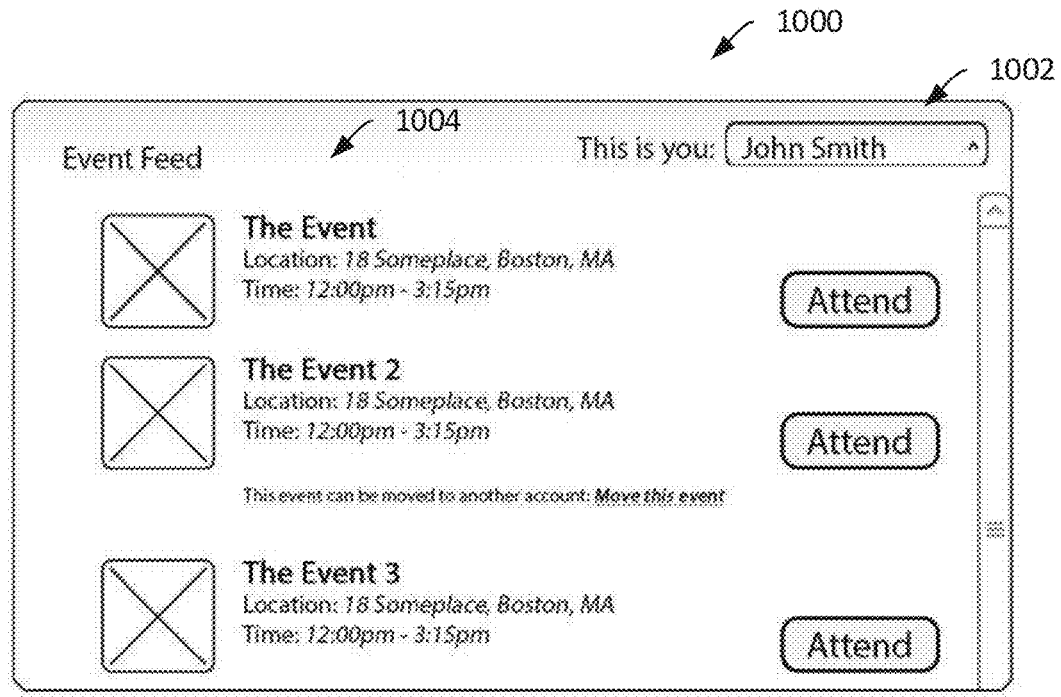
FIGS. 10A, and 10B show an example user interface enabling a user to transfer or migrate information between social media aliases.
Figure 10B:
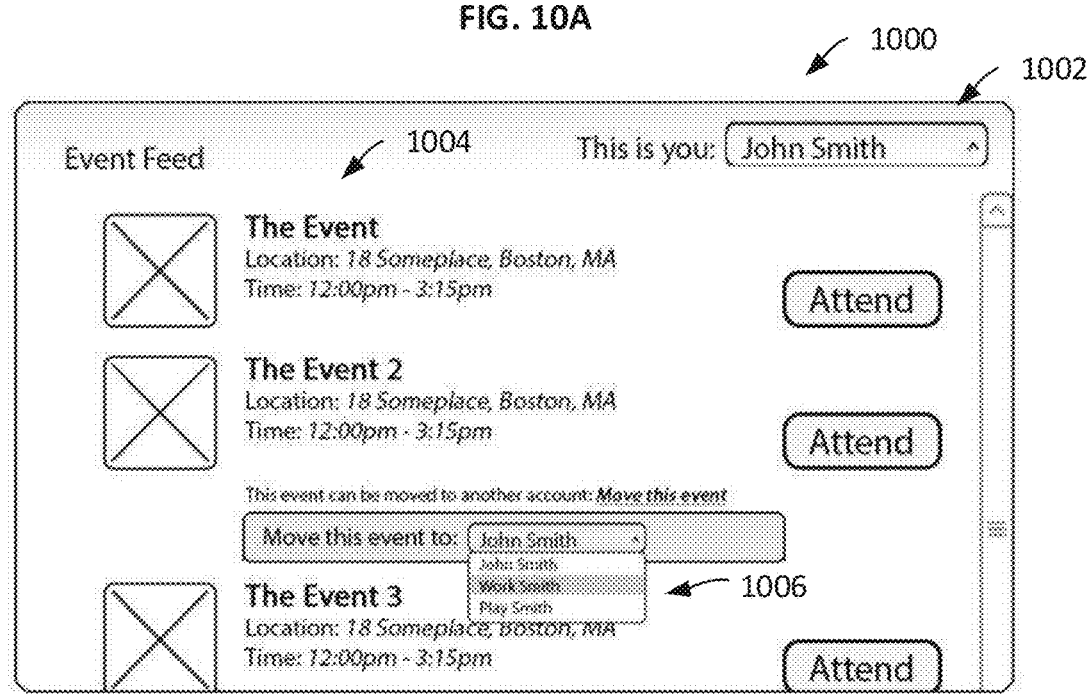

An example user interface 1000 enabling a user to transfer or migrate information between social media aliases is shown in FIGS. 10A and 10B. In a similar manner as the example shown in FIGS. 7A and 7B, the user interface 1000 includes an alias selection element 1002 (e.g., a selection list, drop down bar, or other UI element). The alias selection element 1002 displays a user's currently selected social media alias, as well as any additional social media aliases that have been linked to the currently selected social media alias. The user can view the currently selected social media alias and/or selected a different linked social media alias using the alias election element 1002.

Further, in a similar manner as the example shown in FIGS. 7A and 7B, the user interface 1000 also includes a content portion 1004 that presents content associated with the selected social media alias. For example, as shown in FIG. 10A, the content portion 1004 presents several event invitations that had been transmitted to a particular user with respect to one of the user's social media aliases. Using the content portion 1004, the user can examine information regarding the events, and respond to the event (e.g., by selecting the "Attend" screen element to indicate that he is planning on attending the event). If the user chooses to respond to the event, the social media platform can present the response to one of the other users (e.g., transmit a message to the event administrator and/or other users), and attribute the response to the user's selected social media alias.

As described herein, a user can transfer or migrate content from one social media alias to another. For example, as shown in FIG. 10A, the user can instruct the social media platform to transfer a particular element (e.g., "The Event 2") to another social media alias (e.g., by selecting the "Move this event" command). As shown in FIG. 10B, in response, the content portion 1004 updates the display each of the user's other linked social media aliases (e.g., in the selector element 1006). The user can select one of the linked social media aliases. In response, the social media platform transfers the event to the selected social media alias.

Figure 11:
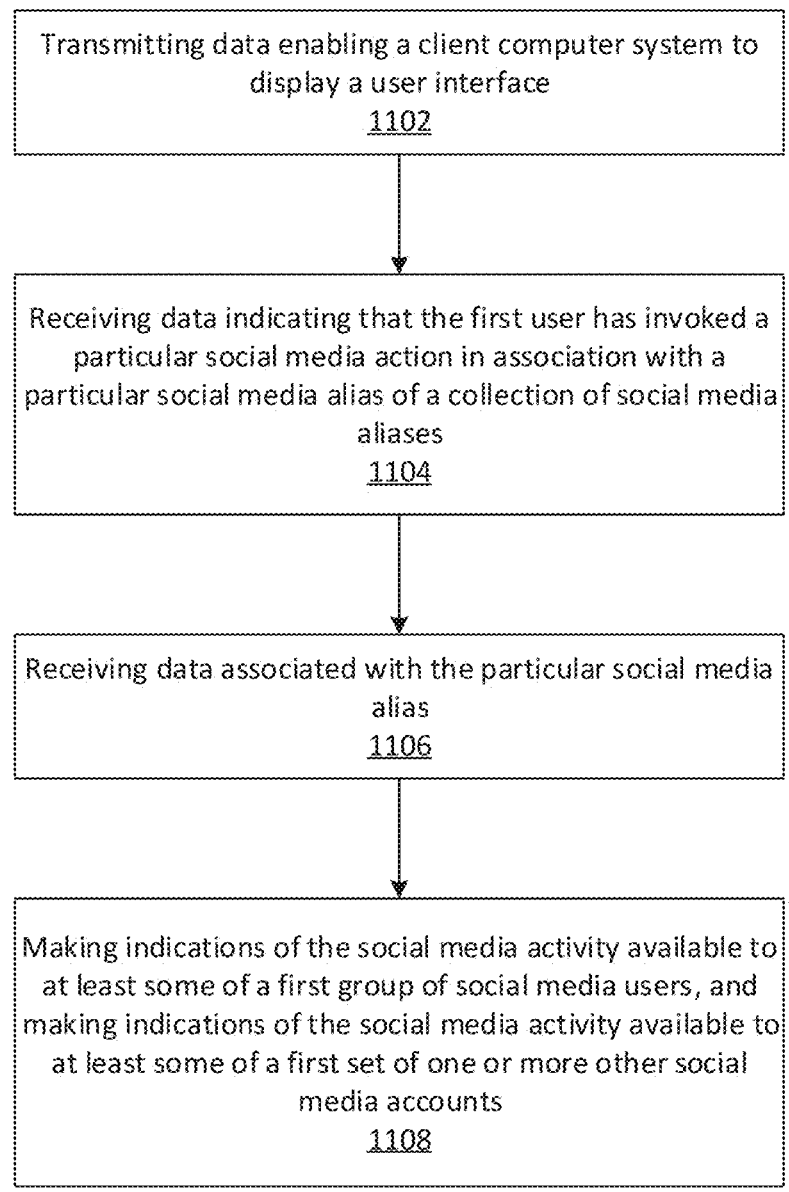
FIG. 11 is a flow chart diagram of an example process for providing a user with multiple different user aliases on a social media platform.

An example process 1100 for providing a user with multiple different user aliases on a social media platform is shown in FIG. 11.

In the process 1100, data is transmitted by a computer-implemented social media platform (step 1102). The data enables a client computer system to display a user interface. The user interface includes one or more first user interface elements that enable a first user of the user interface to invoke one or more social media actions, and one or more second user interface elements that enable the first user of the user interface to select an alias from among a collection of two or more social media aliases associated with the first user. Example user interfaces are shown, for example, in FIGS. 7A, 7B, 10A, and 10B.

Each of the social media aliases is associated with data representing respective social media connections between the first user and each user of a group of social media users, and data identifying one or more respective social media accounts of one or more other social media platforms and associated with the first user.

The computer-implemented social media platform receives data indicating that the first user has invoked a particular social media action in association with a particular social media alias of the collection of social media aliases (step 1104). A social media action can include, for example, sending or receive a message, sending or receiving an event invitation, responding to an event invitation (e.g., RSVPing to an event or indicating the user's extended attendance status with respect to the event), publishing content (e.g., text, images, video, and/or audio), associating or disassociating with other user (e.g., "friending," associating, or linking with other users), reacting to content (e.g., "liking" or "disliking" content"), among other activities.

The computer-implemented social media platform further receives data associated with the particular social media alias (step 1106). The data includes data representing respective social media connections between the first user and each user of a first group of social media users, and data identifying a first set of one or more social media accounts of one or more other social media platforms and associated with the first user.

Based on the social media activity, respective indications of the social media activity are made available to at least some of the first group of social media users, and respective indications of the social media activity are made available to at least some of the first set of one or more other social media accounts (step 1108).

In some cases, a first indication of the social media activity can be made available to a first social media account of the first set of one or more social media accounts. This can include determining an access credential associated with the first social media account, and transmitting the access credential to a first social media platform associated with the first social media account. This can also include receiving, in association with the first social media account, an indication of granted access to the first social media platform, and formatting data representing the social media activity for the first social media platform. This can further include transmitting, to the first social media platform, the data representing the social media activity.

In some cases, the social media activity can include updating the status of the first user with respect to a social media event of the social media platform, and formatting data representing the social media activity for the first social media platform. This can include identifying that a representation of the social media event is available at the first social media platform, generating data identifying the social media event to the first social media platform, and generating data representing a response to the social media event. The response can include a status derived from the social media activity.

In some cases, the collection of two or more social media aliases can include a first social media alias that includes data representing respective social media connections between the first user and each user of a first group of social media users, and data identifying a first social media account of a first social media platform and associated with the first user. The collection can also include a second social media alias that includes data representing respective social media connections between the first user and each user of a second group of social media users, and data identifying a second social media account of a second social media platform and associated with the first user. In some cases, at least some of the users of the first group are not in the second group.

In some cases, the second social media alias can include at least one of: data identifying a third social media account of the first social media platform and associated with the first user, or data identifying the first social media account of the first social media platform and associated with the first user.

Figure 12:
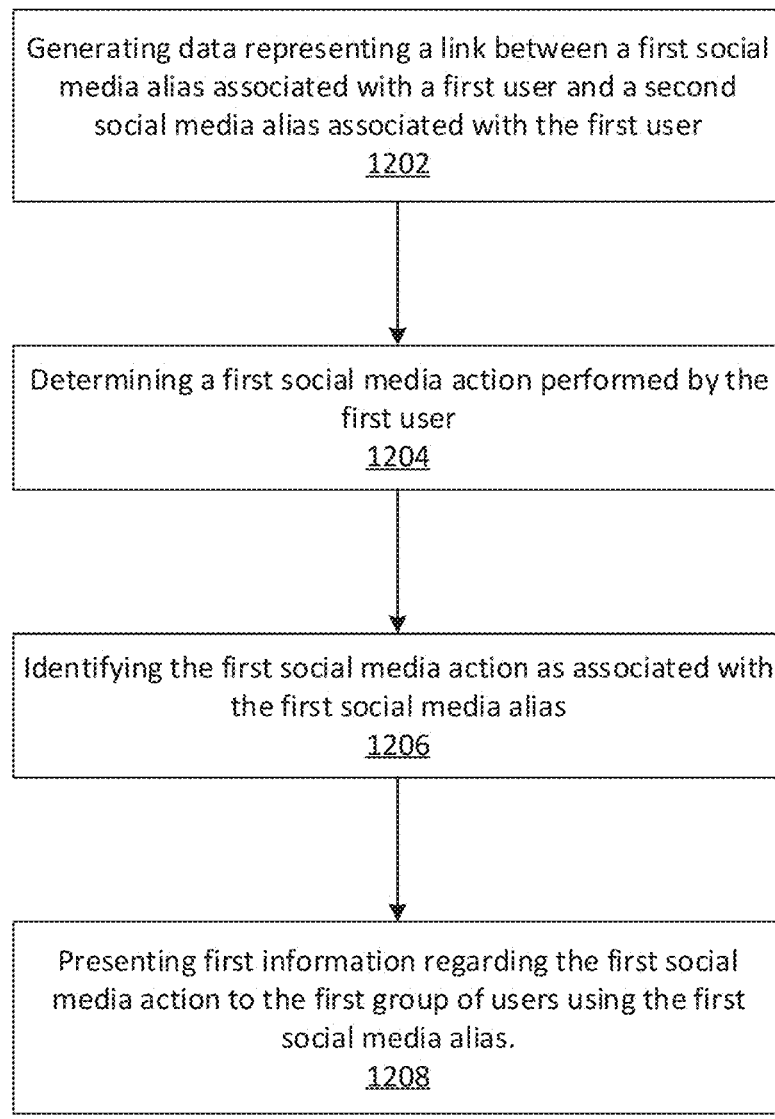
FIG. 12 is a flow chart diagram of another example process for providing a user with multiple different user aliases on a social media platform.

Another example process 1200 for providing a user with multiple different user aliases on a social media platform is shown in FIG. 12.

In the process 1200, a computer-implemented social media platform generates data representing a link between a first social media alias associated with a first user and a second social media alias associated with the first user (step 1202). The first social media alias is associated with one or more first social media accounts maintained by the first user, and defines one or more connections between the first user and a first group of users. Further, the second social media alias is associated with one or more second social media accounts maintained by the first user, and defines one or more connections between the first user and a second group of users.

The computer-implemented social media platform determines a first social media action performed by the first user (step 1204). A social media action can include, for example, sending or receive a message, sending or receiving an event invitation, responding to an event invitation (e.g., RSVPing to an event or indicating the user's extended attendance status with respect to the event), publishing content (e.g., text, images, video, and/or audio), associating or disassociating with other user (e.g., "friending," associating, or linking with other users), reacting to content (e.g., "liking" or "disliking" content"), among other activities.

The first social media action is identified as associated with the first social media alias (step 1206).

The computer-implemented social media platform presents first information regarding the first social media action to the first group of users using the first social media alias (step 1208).

In some cases, presenting the first information to the first group of users using the first social media alias can include determining a first subset of users that are members of the second group of users and not members in the first group of users, and withholding the first information from the first subset of users.

In some cases, the first information can include a description of the first social media action performed by the first user with respect to the first social media alias. The first social media action can include at least one of the first user confirming an additional connection between the first user and another user using the first social media alias, the first user transmitting a message to one or more other users using the first social media alias, the first user creating an event listing using the first social media alias, the first user responding to an event invitation using the first social media alias, or the user indicating an interest category using the first social media alias.

In some cases, the process can further include retrieving a first event invitation transmitted to the first user via the first social media alias, receiving a first command to migrate the first event invitation from the first social media alias to the second social media alias. Responsive to receiving the first command, the first event invitation can be removed from the first social media alias, and a copy of the first event invitation can be generated on the second social media alias.

In some cases, the first event invitation can be retrieved from a particular social media account of the one or more first social media accounts. Removing the first event invitation from the first social media alias can include removing the first event invitation from the particular social media account of the one or more first social media accounts.

In some cases, generating a copy of the first event invitation on the second social media alias can include transmitting the copy of the first event invitation to a particular social media account of the one or more second social media accounts.

In some cases, the process can further include retrieving a second event invitation transmitted to the first user via the first social media alias, and determining that the second event invitation cannot be migrated from the first social media alias to the second social media alias. Responsive to determining that the second event invitation cannot be migrated from the first social media alias to the second social media alias, an indication can be generated to the first user.

In some cases, generating the indication can include generating a user interface element indicating that the second event invitation cannot be migrated from the first social media alias to the second social media alias.

In some cases, determining that the second event invitation cannot be migrated from the first social media alias to the second social media alias can include determining that the second event invitation corresponds to an event having an invitation restriction.

In some cases, the process can further include receiving a second command to respond to the event invitation. Responsive to receiving the second command, the response to the event invitation can be transmitted using the second social media alias.

In some cases, transmitting the response to the event invitation using the second social media alias can include transmitting the response to the particular social media account of the one or more second social media accounts.

In some cases, the process can further include receiving a first command from the first user to transmit a first message to a second user using the first social media alias. In response to receiving the first command, the first message can be transmitted to the second user using the first social media alias. Subsequent to transmitting the first message, a second command can be received from the first user to migrate the first message from the first social media alias to the second social media alias. Responsive to receiving the second command, a determination can be made whether the second user is common to the first group of users and the second group of users. Upon determining that the second user is common to the first group of users and the second group of users, the first message can be removed from the first social media alias. A copy of the first message can be transmitted to the second user using the second social media alias.

In some cases, the process can further include receiving a third command from the first user to transmit a second message to a third user using the first social media alias. Responsive to receiving the third command, the second message can be transmitted to the third user using the first social media alias. Subsequent to transmitting the second message, a fourth command can be received from the first user to migrate the second message from the first social media alias to the second social media alias. Responsive to receiving the fourth command, a determination can be made whether the third user is common to the first group of users and the second group of users. Upon determining that the second user is not common to the first group of users and the second group of users, the second message can be maintained with respect to the first social media alias.

In some cases, the message can include at least one of an event invitation, a response to an event invitation, a request to establish a connection between the user and another user, or a confirmation of a connection between the first user and another user.

In some cases, the one or more connections between the first user and the first group of users can be determined based on information retrieved from the first social media account.

In some cases, the one or more connections between the first user and the second group of users can be determined based on information retrieved from the second social media account.

Although social media aliases are described herein in respect to various social media actions (e.g., publishing content, communicating with other users, interacting with event invitations, etc.), these are merely illustrative examples. It is understood that information regarding any social media action can be segregated or compartmentalized through the use of linked social media aliases, such that a user can precisely control the dissemination of information to others. As examples, other social media actions include information regarding a user confirming an additional connection between the user and another user (e.g., information regarding the user accepting a "friend" or connection invite from another user), information regarding a user creating an event listing, information regarding a user adding an interest category of genre to his personal "profile," among others.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the server systems 102, 104*a*, and 104*b*, the platforms 108a, 108b, and 150, and the client devices 110a-c can be implemented using digital electronic circuitry, or in computer software, firmware, or hardware, or in combinations of one or more of them. In another example, the processes 1100, 1200 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 13:
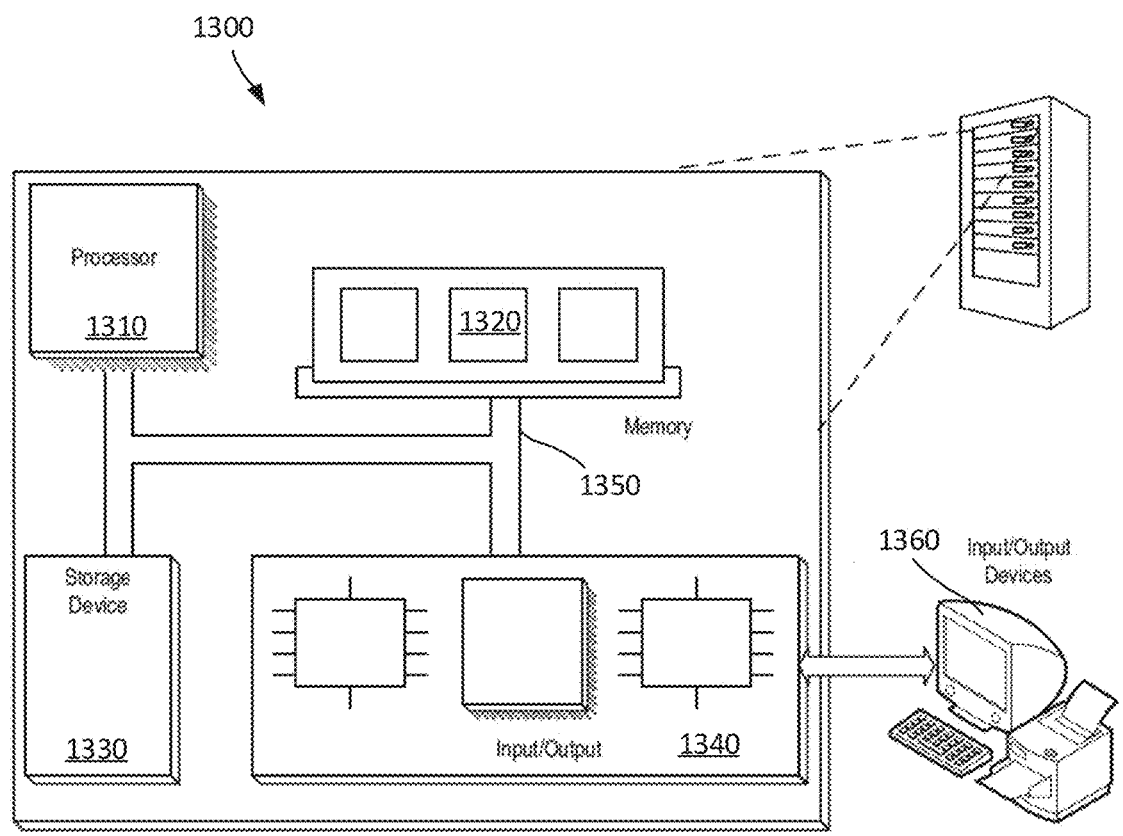
FIG. 13 is a diagram of an example computer system.

FIG. 13 shows an example computer system 1300 that includes a processor 1310, a memory 1320, a storage device 1330 and an input/output device 1340. Each of the components 1310, 1320, 1330 and 1340 can be interconnected, for example, by a system bus 1350. The processor 1310 is capable of processing instructions for execution within the system 1300. In some implementations, the processor 1310 is a single-threaded processor, a multi-threaded processor, or another type of processor. The processor 1310 is capable of processing instructions stored in the memory 1320 or on the storage device 1330. The memory 1320 and the storage device 1330 can store information within the system 1300.

The input/output device 1340 provides input/output operations for the system 1300. In some implementations, the input/output device 1340 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 1360. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. A method comprising:
   generating, by a computer-implemented social media platform, data representing a link between a first social media alias associated with a first user and a second social media alias associated with the first user,
   wherein the first social media alias is associated with one or more first social media accounts maintained by the first user, and defines one or more connections between the first user and a first group of users, and
   wherein the second social media alias is associated with one or more second social media accounts maintained by the first user, and defines one or more connections between the first user and a second group of users;
   determining, by the computer-implemented social media platform, a first social media action performed by the first user;
   identifying the first social media action as associated with the first social media alias;
   presenting, by the computer-implemented social media platform, first information regarding the first social media action to the first group of users using the first social media alias;
   receiving, by the computer-implemented social media platform, a first command from the first user to transmit a first message to a second user using the first social media alias;
   responsive to receiving the first command, transmitting, by the computer-implemented social media platform, the first message to the second user using the first social media alias;
   subsequent to transmitting the first message, receiving, by the computer-implemented social media platform, a second command from the first user to migrate the first message from the first social media alias to the second social media alias;
   responsive to receiving the second command:
   determining, by the computer-implemented social media platform, whether the second user is common to the first group of users and the second group of users; and
   upon determining that the second user is common to the first group of users and the second group of users, removing, by the computer-implemented social media platform, the first message from the first social media alias and transmitting, by the computer-implemented social media platform, a copy of the first message to the second user using the second social media alias.

2. The method of claim 1, wherein presenting the first information to the first group of users using the first social media alias comprises:
   determining, by the computer-implemented social media platform, a first subset of users that are members of the second group of users and not members in the first group of users; and
   withholding, by the computer-implemented social media platform, the first information from the first subset of users.

3. The method of claim 1, wherein the first information comprises a description of the first social media action performed by the first user with respect to the first social media alias.

4. The method of claim 3, wherein the first social media action comprises at least one of the first user confirming an additional connection between the first user and another user using the first social media alias, the first user transmitting a message to one or more other users using the first social media alias, the first user creating an event listing using the first social media alias, the first user responding to an event invitation using the first social media alias, or the user indicating an interest category using the first social media alias.

5. The method of claim 1, further comprising:
   retrieving, by the computer-implemented social media platform, a first event invitation transmitted to the first user via the first social media alias;
   receiving, by the computer-implemented social media platform, a third command to migrate the first event invitation from the first social media alias to the second social media alias;
   responsive to receiving the third command:
   removing, by the computer-implemented social media platform, the first event invitation from the first social media alias; and
   generating, by the computer-implemented social media platform, a copy of the first event invitation on the second social media alias.

6. The method of claim 5, wherein the first event invitation was retrieved from a particular social media account of the one or more first social media accounts, and
   wherein removing the first event invitation from the first social media alias comprises removing the first event invitation from the particular social media account of the one or more first social media accounts.

7. The method of claim 6, wherein generating a copy of the first event invitation on the second social media alias comprises transmitting the copy of the first event invitation to a particular social media account of the one or more second social media accounts.

8. The method of claim 5, further comprising:
retrieving, by the computer-implemented social media platform, a second event invitation transmitted to the first user via the first social media alias;
determining that the second event invitation cannot be migrated from the first social media alias to the second social media alias; and
responsive to determining that the second event invitation cannot be migrated from the first social media alias to the second social media alias, generating an indication to the first user.

9. The method of claim 8, wherein generating the indication comprises generating a user interface element indicating that the second event invitation cannot be migrated from the first social media alias to the second social media alias.

10. The method of claim 8, wherein determining that the second event invitation cannot be migrated from the first social media alias to the second social media alias comprises determining that the second event invitation corresponds to an event having an invitation restriction.

11. The method of claim 5, further comprising:
receiving, by the computer-implemented social media platform, a third command to respond to the event invitation;
responsive to receiving the third command, transmitting, by the computer-implemented social media platform, the response to the event invitation using the second social media alias.

12. The method of claim 11, wherein transmitting the response to the event invitation using the second social media alias comprises transmitting the response to the particular social media account of the one or more second social media accounts.

13. The method of claim 1, further comprising:
receiving, by the computer-implemented social media platform, a third command from the first user to transmit a second message to a third user using the first social media alias;
responsive to receiving the third command, transmitting, by the computer-implemented social media platform, the second message to the third user using the first social media alias;
subsequent to transmitting the second message, receiving, by the computer-implemented social media platform, a fourth command from the first user to migrate the second message from the first social media alias to the second social media alias;
responsive to receiving the fourth command:
determining, by the computer-implemented social media platform, whether the third user is common to the first group of users and the second group of users; and
upon determining that the second user is not common to the first group of users and the second group of users, maintaining, by the computer-implemented social media platform, the second message with respect to the first social media alias.

14. The method of claim 1, wherein the message comprises at least one of an event invitation, a response to an event invitation, a request to establish a connection between the user and another user, or a confirmation of a connection between the first user and another user.

15. The method of claim 1, wherein the one or more connections between the first user and the first group of users is determined based on information retrieved from the first social media account.

16. The method of claim 15, wherein the one or more connections between the first user and the second group of users is determined based on information retrieved from the second social media account.

17. A system comprising:
one or more processors; and
one or more non-transitory computer-readable media storing instructions that, when executed by the one or more processors, cause the one or more processors to perform operations comprising:
generating, by a computer-implemented social media platform, data representing a link between a first social media alias associated with a first user and a second social media alias associated with the first user,
wherein the first social media alias is associated with one or more first social media accounts maintained by the first user, and defines one or more connections between the first user and a first group of users, and
wherein the second social media alias is associated with one or more second social media accounts maintained by the first user, and defines one or more connections between the first user and a second group of users;
determining, by the computer-implemented social media platform, a first social media action performed by the first user;
identifying the first social media action as associated with the first social media alias;
presenting, by the computer-implemented social media platform, first information regarding the first social media action to the first group of users using the first social media alias;
receiving, by the computer-implemented social media platform, a first command from the first user to transmit a first message to a second user using the first social media alias;
responsive to receiving the first command, transmitting, by the computer-implemented social media platform, the first message to the second user using the first social media alias;
subsequent to transmitting the first message, receiving, by the computer-implemented social media platform, a second command from the first user to migrate the first message from the first social media alias to the second social media alias;
responsive to receiving the second command:
determining, by the computer-implemented social media platform, whether the second user is common to the first group of users and the second group of users; and
upon determining that the second user is common to the first group of users and the second group of users, removing, by the computer-implemented social media platform, the first message from the first social media alias and transmitting, by the computer-implemented social media platform, a copy of the first message to the second user using the second social media alias.

18. The system of claim 17, wherein presenting the first information to the first group of users using the first social media alias comprises:
determining, by the computer-implemented social media platform, a first subset of users that are members of the second group of users and not members in the first group of users; and
withholding, by the computer-implemented social media platform, the first information from the first subset of users.

19. The system of claim 17, wherein the first information comprises a description of the first social media action performed by the first user with respect to the first social media alias.

20. The system of claim 19, wherein the first social media action comprises at least one of the first user confirming an additional connection between the first user and another user using the first social media alias, the first user transmitting a message to one or more other users using the first social media alias, the first user creating an event listing using the first social media alias, the first user responding to an event invitation using the first social media alias, or the user indicating an interest category using the first social media alias.

21. The system of claim 17, the operations further comprising:
retrieving, by the computer-implemented social media platform, a first event invitation transmitted to the first user via the first social media alias;
receiving, by the computer-implemented social media platform, a third command to migrate the first event invitation from the first social media alias to the second social media alias;
responsive to receiving the third command:
removing, by the computer-implemented social media platform, the first event invitation from the first social media alias; and
generating, by the computer-implemented social media platform, a copy of the first event invitation on the second social media alias.

22. The system of claim 21, wherein the first event invitation was retrieved from a particular social media account of the one or more first social media accounts, and
wherein removing the first event invitation from the first social media alias comprises removing the first event invitation from the particular social media account of the one or more first social media accounts.

23. The system of claim 22, wherein generating a copy of the first event invitation on the second social media alias comprises transmitting the copy of the first event invitation to a particular social media account of the one or more second social media accounts.

24. The system of claim 21, the operations further comprising:
retrieving, by the computer-implemented social media platform, a second event invitation transmitted to the first user via the first social media alias;
determining that the second event invitation cannot be migrated from the first social media alias to the second social media alias; and
responsive to determining that the second event invitation cannot be migrated from the first social media alias to the second social media alias, generating an indication to the first user.

25. The system of claim 24, wherein generating the indication comprises generating a user interface element indicating that the second event invitation cannot be migrated from the first social media alias to the second social media alias.

26. The system of claim 24, wherein determining that the second event invitation cannot be migrated from the first social media alias to the second social media alias comprises determining that the second event invitation corresponds to an event having an invitation restriction.

27. The system of claim 21, the operations further comprising:
receiving, by the computer-implemented social media platform, a third command to respond to the event invitation;
responsive to receiving the third command, transmitting, by the computer-implemented social media platform, the response to the event invitation using the second social media alias.

28. The system of claim 27, wherein transmitting the response to the event invitation using the second social media alias comprises transmitting the response to the particular social media account of the one or more second social media accounts.

29. The system of claim 17, the operations further comprising:
receiving, by the computer-implemented social media platform, a third command from the first user to transmit a second message to a third user using the first social media alias;
responsive to receiving the third command, transmitting, by the computer-implemented social media platform, the second message to the third user using the first social media alias;
subsequent to transmitting the second message, receiving, by the computer-implemented social media platform, a fourth command from the first user to migrate the second message from the first social media alias to the second social media alias;
responsive to receiving the fourth command:
determining, by the computer-implemented social media platform, whether the third user is common to the first group of users and the second group of users; and
upon determining that the second user is not common to the first group of users and the second group of users, maintaining, by the computer-implemented social media platform, the second message with respect to the first social media alias.

30. The system of claim 17, wherein the message comprises at least one of an event invitation, a response to an event invitation, a request to establish a connection between the user and another user, or a confirmation of a connection between the first user and another user.

31. The system of claim 17, wherein the one or more connections between the first user and the first group of users is determined based on information retrieved from the first social media account.

32. The system of claim 31, wherein the one or more connections between the first user and the second group of users is determined based on information retrieved from the second social media account.

33. One or more non-transitory computer-readable media storing instructions that, when executed by one or more processors, cause the one or more processors to perform operations comprising:
generating, by a computer-implemented social media platform, data representing a link between a first social media alias associated with a first user and a second social media alias associated with the first user,
wherein the first social media alias is associated with one or more first social media accounts maintained by the first user, and defines one or more connections between the first user and a first group of users, and
wherein the second social media alias is associated with one or more second social media accounts maintained by the first user, and defines one or more connections between the first user and a second group of users;

determining, by the computer-implemented social media platform, a first social media action performed by the first user;

identifying the first social media action as associated with the first social media alias;

presenting, by the computer-implemented social media platform, first information regarding the first social media action to the first group of users using the first social media alias;

receiving, by the computer-implemented social media platform, a first command from the first user to transmit a first message to a second user using the first social media alias;

responsive to receiving the first command, transmitting, by the computer-implemented social media platform, the first message to the second user using the first social media alias;

subsequent to transmitting the first message, receiving, by the computer-implemented social media platform, a second command from the first user to migrate the first message from the first social media alias to the second social media alias;

responsive to receiving the second command:
  determining, by the computer-implemented social media platform, whether the second user is common to the first group of users and the second group of users; and
  upon determining that the second user is common to the first group of users and the second group of users, removing, by the computer-implemented social media platform, the first message from the first social media alias and transmitting, by the computer-implemented social media platform, a copy of the first message to the second user using the second social media alias.

34. The one or more non-transitory computer readable media of claim 33, wherein presenting the first information to the first group of users using the first social media alias comprises:
  determining, by the computer-implemented social media platform, a first subset of users that are members of the second group of users and not members in the first group of users; and
  withholding, by the computer-implemented social media platform, the first information from the first subset of users.

35. The one or more non-transitory computer readable media of claim 33, wherein the first information comprises a description of the first social media action performed by the first user with respect to the first social media alias.

36. The one or more non-transitory computer readable media of claim 35, wherein the first social media action comprises at least one of the first user confirming an additional connection between the first user and another user using the first social media alias, the first user transmitting a message to one or more other users using the first social media alias, the first user creating an event listing using the first social media alias, the first user responding to an event invitation using the first social media alias, or the user indicating an interest category using the first social media alias.

37. The one or more non-transitory computer readable media of claim 33, the operations further comprising:
  retrieving, by the computer-implemented social media platform, a first event invitation transmitted to the first user via the first social media alias;

receiving, by the computer-implemented social media platform, a third command to migrate the first event invitation from the first social media alias to the second social media alias;

responsive to receiving the third command:
    removing, by the computer-implemented social media platform, the first event invitation from the first social media alias; and
    generating, by the computer-implemented social media platform, a copy of the first event invitation on the second social media alias.

38. The one or more non-transitory computer readable media of claim 37, wherein the first event invitation was retrieved from a particular social media account of the one or more first social media accounts, and
  wherein removing the first event invitation from the first social media alias comprises removing the first event invitation from the particular social media account of the one or more first social media accounts.

39. The one or more non-transitory computer readable media of claim 38, wherein generating a copy of the first event invitation on the second social media alias comprises transmitting the copy of the first event invitation to a particular social media account of the one or more second social media accounts.

40. The one or more non-transitory computer readable media of claim 37, the operations further comprising:
  retrieving, by the computer-implemented social media platform, a second event invitation transmitted to the first user via the first social media alias;
  determining that the second event invitation cannot be migrated from the first social media alias to the second social media alias; and
  responsive to determining that the second event invitation cannot be migrated from the first social media alias to the second social media alias, generating an indication to the first user.

41. The one or more non-transitory computer readable media of claim 40, wherein generating the indication comprises generating a user interface element indicating that the second event invitation cannot be migrated from the first social media alias to the second social media alias.

42. The one or more non-transitory computer readable media of claim 40, wherein determining that the second event invitation cannot be migrated from the first social media alias to the second social media alias comprises determining that the second event invitation corresponds to an event having an invitation restriction.

43. The one or more non-transitory computer readable media of claim 37, the operations further comprising:
  receiving, by the computer-implemented social media platform, a third command to respond to the event invitation;
  responsive to receiving the third command, transmitting, by the computer-implemented social media platform, the response to the event invitation using the second social media alias.

44. The one or more non-transitory computer readable media of claim 43, wherein transmitting the response to the event invitation using the second social media alias comprises transmitting the response to the particular social media account of the one or more second social media accounts.

45. The one or more non-transitory computer readable media of claim 33, the operations further comprising:
- receiving, by the computer-implemented social media platform, a third command from the first user to transmit a second message to a third user using the first social media alias;
- responsive to receiving the third command, transmitting, by the computer-implemented social media platform, the second message to the third user using the first social media alias;
- subsequent to transmitting the second message, receiving, by the computer-implemented social media platform, a fourth command from the first user to migrate the second message from the first social media alias to the second social media alias;
- responsive to receiving the fourth command:
- determining, by the computer-implemented social media platform, whether the third user is common to the first group of users and the second group of users; and
- upon determining that the second user is not common to the first group of users and the second group of users, maintaining, by the computer-implemented social media platform, the second message with respect to the first social media alias.

46. The one or more non-transitory computer readable media of claim 33, wherein the message comprises at least one of an event invitation, a response to an event invitation, a request to establish a connection between the user and another user, or a confirmation of a connection between the first user and another user.

47. The one or more non-transitory computer readable media of claim 33, wherein the one or more connections between the first user and the first group of users is determined based on information retrieved from the first social media account.

48. The one or more non-transitory computer readable media of claim 47, wherein the one or more connections between the first user and the second group of users is determined based on information retrieved from the second social media account.

* * * * *